United States Patent
Carr et al.

(10) Patent No.: US 10,979,303 B1
(45) Date of Patent: Apr. 13, 2021

(54) SEGMENTATION OF MAINTENANCE ON DISTRIBUTED SYSTEMS

(71) Applicant: Amazon Technologies, Inc., Seattle, WA (US)

(72) Inventors: Jacob Shannan Carr, Seattle, WA (US); Stanislav Pavlovskii, Sammamish, WA (US); Brian Thomas Kachmarck, Seattle, WA (US); Kanika Kalra, Vancouver (CA); Amit Chhabra, Vancouver (CA); Chaiwat Shuetrakoonpaiboon, Vancouver (CA); Chen Zhou, Burnaby (CA); Jazarine Jamal, Vancouver (CA); Muhammad Usman, Vancouver (CA); Syed Sajid Nizami, Vancouver (CA); Gracjan Polak, Vancouver (CA); Asad Khan Durrani, Vancouver (CA); Ryan Preston Gantt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 16/434,091

(22) Filed: Jun. 6, 2019

(51) Int. Cl.
*H04L 12/24* (2006.01)
*H04L 12/26* (2006.01)
*H04L 29/08* (2006.01)

(52) U.S. Cl.
CPC .......... *H04L 41/14* (2013.01); *H04L 43/0876* (2013.01); *H04L 67/10* (2013.01)

(58) Field of Classification Search
CPC .. H04L 41/14; H04L 43/0876; H04L 4167/10
See application file for complete search history.

(56) References Cited

U.S. PATENT DOCUMENTS

| | | | |
|---|---|---|---|
| 8,880,477 B2 | 11/2014 | Barker et al. | |
| 9,256,633 B2* | 2/2016 | Huras | G06F 16/2282 |
| 9,678,688 B2* | 6/2017 | Bates | G06F 3/0641 |
| 9,792,321 B2 | 10/2017 | Buehne et al. | |
| 9,805,071 B1 | 10/2017 | Ellis et al. | |
| 9,881,035 B2 | 1/2018 | Engelko et al. | |

(Continued)

OTHER PUBLICATIONS

U.S. Appl. No. 16/401,039, filed May 1, 2019, Abhijit Chaudhuri et al.

*Primary Examiner* — El Hadji M Sall
(74) *Attorney, Agent, or Firm* — Robert C. Kowert; Kowert, Hood, Munyon, Rankin & Goetzel, P.C.

(57) ABSTRACT

Methods, systems, and computer-readable media for segmentation of maintenance on distributed systems are disclosed. A data set is partitioned according to a hash function into a plurality of segments. A maintenance activity is initiated on a first segment. During the maintenance activity, a first request to perform a first action on the data set is received. Based at least in part on determining that the first request is associated with the first segment using the hash function, the first action is performed using additional processing associated with the maintenance activity. During the maintenance activity, a second request to perform a second action on the data set is received. Based at least in part on determining that the second request is associated with a second segment using the hash function, the second action is performed without the additional processing associated with the maintenance activity.

20 Claims, 16 Drawing Sheets

(56) References Cited

U.S. PATENT DOCUMENTS

| | | |
|---|---|---|
| 9,927,992 B2 | 3/2018 | Driesen et al. |
| 9,984,101 B2 | 5/2018 | Meder |
| 10,185,727 B1 | 1/2019 | Wilton et al. |
| 10,187,466 B2 | 1/2019 | Sanderson |
| 10,191,922 B2 | 1/2019 | Michael et al. |
| 10,268,633 B2 | 4/2019 | Mohanty et al. |
| 2012/0323970 A1* | 12/2012 | Larson ................ G06F 16/9014 707/800 |
| 2018/0329738 A1* | 11/2018 | Kasha ................... G06F 9/5038 |

* cited by examiner

SEGMENTATION OF MAINTENANCE ON DISTRIBUTED SYSTEMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. For example, in a distributed system, a variety of storage services may be provided for storing data sets on behalf of clients. Storage services may vary in their performance, availability, storage capacity, cost, and other characteristics. In some circumstances, a client may seek to migrate a data set from one storage service to another. Prior approaches to migration often required outages during which the entire data set was inaccessible by client applications for the duration of the outage.

Figure 1:
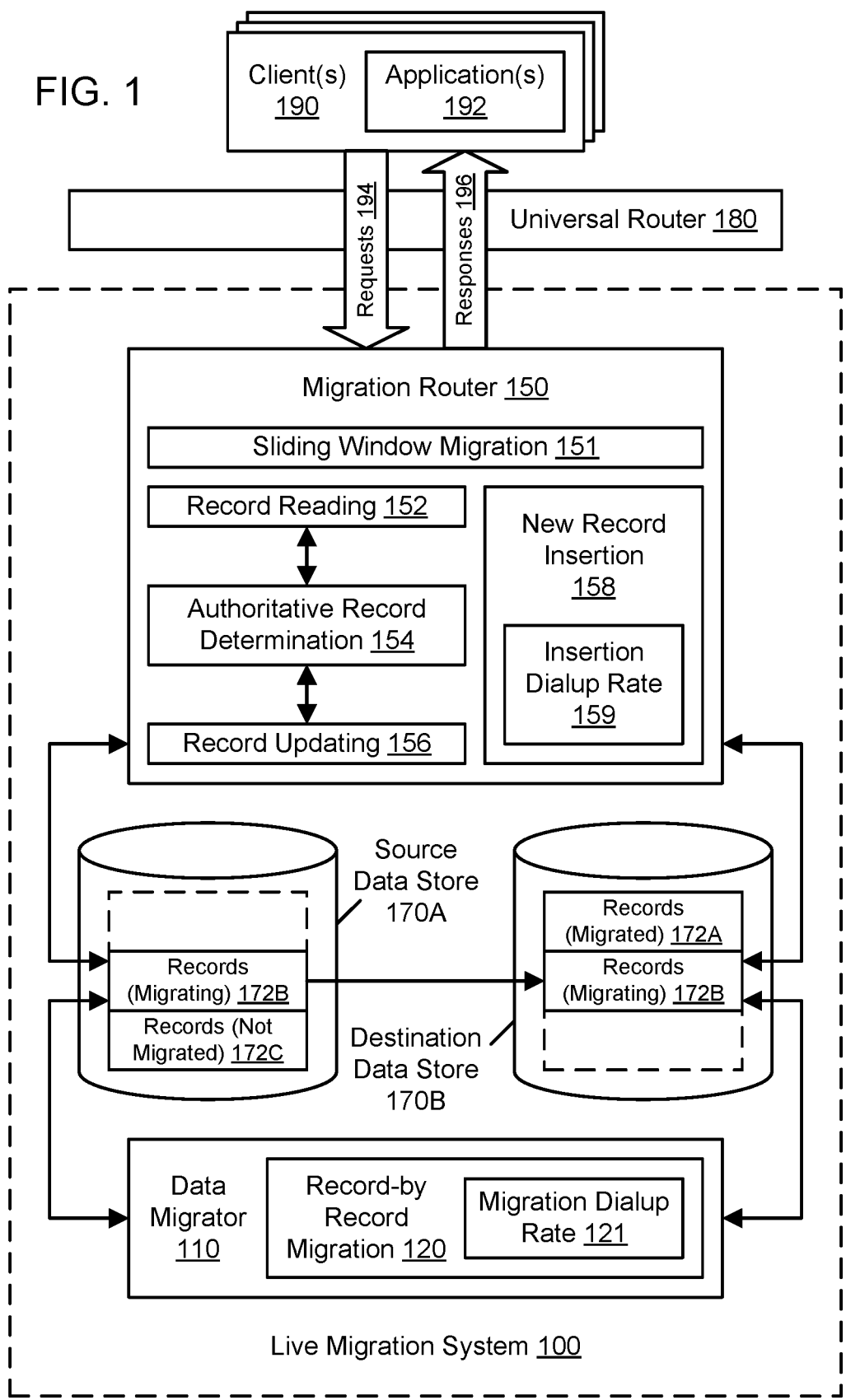
FIG. 1 illustrates an example system environment for record-by-record live migration using segmentation, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for record-by-record live migration using segmentation are described. A client of a live migration system may request migration of a data set from a source data store to a destination data store, or the live migration system itself may decide to initiate the migration in a manner transparent to the client. The source and destination data stores may vary in their performance, availability, storage capacity, location, and/or other characteristics, and the migration may seek to take advantage of such characteristics offered by the destination data store. Prior approaches to migration often required outages during which the entire data set was inaccessible by client applications for the duration of the outage. For example, an outage was often taken near the end of the migration while authority for the entire data set was flipped from the source to the destination. Using the live migration techniques described herein, a data set may be migrated between data stores record-by-record while the data set remains generally accessible to clients (e.g., for reads, writes, and deletes) and never undergoes a data-set-wide outage where clients cannot access the entire data set.

The live migration system described herein may include a data migrator that manages migration of the data set from the source to the destination on a record-by-record basis. Different segments of the data set may be migrated at different times to minimize the overhead of the migration. An individual record within a segment may be migrated by marking the record offline in the source, moving the record to the destination and marking it as online in the destination, and deleting the record from the source. Records may be migrated according to a migration dialup rate, and the migration dialup rate may be automatically modified from time to time based on performance metrics (e.g., the success rate of per-record migration). While records are being migrated, a migration router may accept data access requests (e.g., reads, writes, and deletes) from clients. To perform reads and updates involving existing records, the migration router may use the authoritative instance of the record in the source or destination, and the authoritative instance may be determined using status metadata. For example, if a record is marked as offline in the source and online in the destination, the migration router may determine that the destination has the authoritative instance. If a record is in the process of being migrated (e.g., the record is offline in the source and not yet available in the destination), then a request to access that record may produce a retriable error. However, because the authority for records may be flipped from the source to the destination on a record-by-record basis, the entire data set need not be made unavailable during a data-set-wide authority flip. To perform insertions of new records, the migration router may select either the source or destination according to an insertion dialup rate. The insertion dialup rate may be automatically modified from time to time based on performance metrics (e.g., for the affected data stores) and may eventually result in all new insertions being performed in the destination. Migrations may be transparent to client applications through the use of a universal router that directs client requests to the migration router such that the applications need not be modified to perform live migrations.

Various embodiments of methods, systems, and computer-readable media for segmentation of maintenance on distributed systems are described. A distributed system may involve numerous hosts, servers, compute instances, storage instances, or other components that interact via a network (or other interconnects) to perform tasks. A distributed system may undergo maintenance activities from time to time. For example, a data store may be migrated from a source to a destination. As another example, a database may be optimized to improve query performance. As yet another example, customer order histories for an online store may be subjected to analysis. To improve the performance of a distributed system during a maintenance activity, the data set on which the distributed system operates may be partitioned into a plurality of segments using a hash function or other criterion. The hash function may map a key space of the data set into a hash space, and the hash space may be divided appropriately into the segments. Keys may identify various elements of data such as records in a data store, requests to services in a service-oriented architecture, customer accounts with an online store, and so on. One or more segments of the data set may be subjected to the maintenance activity at a given time, while other segments may not be subjected to the activity at that time. In one embodiment, the maintenance activity may iterate through the segments (e.g., one at a time) until the entire data set has been subjected to the activity. During the maintenance activity, requests to a segment under maintenance may be processed with additional overhead related to the maintenance activity. For example, if the maintenance activity is a data store migration, then the additional overhead may include determining an authoritative record by making calls to both the source and destination. Also during the maintenance activity, however, requests to a segment not under maintenance may be processed without the additional overhead related to the maintenance activity. Using the techniques described herein, the impact of maintenance on a distributed system may be limited using segmentation.

As one skilled in the art will appreciate in light of this disclosure, embodiments may be capable of achieving certain technical advantages, including some or all of the following: (1) reducing the latency of access to a data store by migrating only a portion of a data set at a given time; (2) improving the availability of a data store during migration of a data set by continuing to process requests from applications for nearly all of the data set at any given point in the migration; (3) improving the availability of a data store by eliminating the need for a data-set-wide outage associated with an authority flip of the entire data set from the source to the destination; (4) improving the scalability of migration by incrementally and/or adaptively dialing up a record-by-record migration rate from the source to the destination; (5) improving the scalability of migration by incrementally and/or adaptively dialing up a new record insertion rate to the source or the destination; (6) improving availability by performing automated backoff using performance monitoring; (7) reducing the complexity and time associated with application development by not requiring changes to applications for live migration; (8) improving the latency of access to a distributed system by limiting the impact of maintenance activities to particular segments of a data set; (9) improving the availability of a distributed system by selecting a lesser-trafficked segment of the data set for maintenance; and so on.

Record-by-Record Live Migration Using Segmentation

FIG. 1 illustrates an example system environment for record-by-record live migration using segmentation, according to some embodiments. A live migration system 100 may enable a data set to be migrated from one data store (a source 170A) to another data store (a destination 170B) using a data migrator 110 while permitting reads, writes, and deletes from client applications 192 during the migration via a migration router 150. The data set may comprise a set of records in the source 170A, and the migration may move that data set to the destination 170B. The live migration system 100 may migrate one segment or portion of the data set at a given time to reduce migration-related overhead for other segments. The live migration system 100 may minimize application 192 downtime during a migration by taking micro-outages for individual records being migrated but not an outage for the entire data set. The live migration system 100 may maintain the high availability of the source data store 170A and/or destination data store 170B during a migration by adaptively modifying the rate of record-by-record migration and/or the portion of new records inserted in the destination. In one embodiment, the live migration system 100 may prioritize correctness, then data availability, then performance.

Requests 194 from application(s) 192 operated by client(s) 190 may be directed to a universal router 180 before, during, and after a migration. Similarly, responses 196 to the requests may be routed to the application(s) 192 by the universal router 180. By migrating one segment of the data set at a given time, additional migration-related overhead may be minimized for requests 194 associated with segments that are not currently being migrated. Before a migration is initiated, the universal router 180 may forward requests 194 to the source data store 170A. During a migration, the universal router 180 may forward requests 194 to the migration router 150 instead of directly to the source data store 170A or destination data store 170B. After the migration is complete, the universal router 180 may forward requests 194 to the destination data store 170B and no longer use the migration router 150 for the particular data set that was migrated. In one embodiment, the application(s) 192 need not be modified to perform a migration; instead the universal router 180 may be reconfigured to send requests 194 to the migration router 150 during a migration.

The live migration system 100 may be configured to work with a variety of different data stores. In one embodiment, the universal router 180 may translate, reformat, or otherwise modify requests from the application(s) as appropriate for the target data stores, e.g., via data-store-specific adapters. A plurality of data stores such as the source data store 170A and destination data store 170B may each offer storage of records, potentially using different underlying storage technologies, architectures, and/or resource types to store data. The data stores 170A-170B may be accessible via different application programming interfaces (APIs). The data stores 170A-170B may be hosted in the same or different geographical regions or network zones. In one embodiment, the data stores 170A-170B may include NoSQL data stores. In one embodiment, the data stores 170A-170B may include non-relational key-value data stores that store key-value pairs. In one embodiment, the data stores 170A-170B may include relational data stores.

The data migrator 110 may include a component for record-by-record migration 120. Using the record-by-record migration 120, the data migrator 110 may manage migration of the records from the source 170A to the destination 170B on a record-by-record basis. The record-by-record migration 120 may be performed for only a portion of the data set at a given time. The table or data set to be migrated may be divided into a plurality of segments. In one embodiment, keys or other metadata for individual records may be hashed using a hash function, and the hash space may be partitioned into the various segments such that an individual record belongs to one and only one segment. As shown in the example of FIG. 1, the data set may be divided into two or more segments such as segment 172A, segment 172B, and segment 172C. At the point in time illustrated in FIG. 1, the records in segment 172A have been migrated successfully, the records in segment 172B are currently being migrated, and the records in segment 172C have not yet been migrated. By migrating segment-by-segment, the system 100 may migrate using a sliding window within the data set. In some embodiments, the segments may be determined based (at least in part) on one or more selection criteria such that a portion that meets the criteria may be migrated at a given time. In some embodiments, only records meeting the selection criteria may be migrated to the destination 170B, and other records may remain in the source 170A.

An individual record may be migrated (or moved) by marking the record offline in the source 170A, storing an instance of the record in the destination 170B and marking it as online in the destination, and deleting the instance of record from the source. Records may be migrated according to a migration dialup rate 121 that affects the number of records being migrated at one time or over a particular window of time. To perform migration of different records in parallel, the data migrator 110 may use an orchestrator that supplies migration jobs (e.g., indicating keys for records to be migrated) to a plurality of migration workers. In one embodiment, the live migration system 100 may proceed to another segment (e.g., segment 172C) only after all records in the current segment (e.g., 172B) have been moved to the destination 170B.

The migration dialup rate 121 may be automatically modified from time to time based (at least in part) on performance metrics. In some embodiments, the performance metrics may relate to the processor utilization, memory utilization, storage utilization, network utilization, and/or error rate of components such as data stores 170A-170B and/or a fleet of migration workers that implement the migration 120 under the control of an orchestrator. For example, the migration rate 121 may be incrementally reduced (dialed down) if a sufficient number of per-record migration failures are encountered or if metrics indicate that the destination 170B is insufficiently available for migration. Reduction in the migration rate 121 may be performed as part of an automated backoff process when problems are encountered during a migration. As another example, the migration rate 121 may be incrementally increased (dialed up) if metrics indicate that the destination 170B has available capacity for additional migration while the success rate for per-record migration is sufficiently high. In one embodiment, the migration rate 121 may be determined based (at least in part) on a client-specified deadline for completing the migration, a client-specified budget for performing the migration, a predetermined schedule for rate increases, and/or other suitable criteria. By dialing up or dialing down the migration rate 121 in the manner described herein, the system 100 may adapt the migration 120 to the characteristics of the data stores 170A-170B and/or data set.

The migration router 150 may accept data access requests 194 (e.g., reads, writes, and deletes) originating from client(s) 190 during a migration 120. The migration router may include a component for sliding window migration 151, and individual requests 194 may be processed differently based (at least in part) on their membership in a particular segment. In one embodiment, when a request is received, the sliding window migration 151 may use a hash function to generate a hash of a key or other metadata associated with the requested record. The hash space may be partitioned into the segments 172A, 172B, and 172C, and the resulting hash may belong to one and only one of the segments. The request may be processed according to the segment to which the hash belongs. During the migration of segment 172B, requests 194 associated with records in that segment may be subject to the additional overhead of authoritative record determination 154 to determine whether the source 170A or destination 170B is authoritative for the requested record. However, at the point in time shown in FIG. 1, requests 194 for previously migrated segment 172A and not yet migrated segment 172C may not be subject to the additional overhead of authoritative record determination 154. Instead, requests associated with segment 172A may be directed to the destination data store 170B without undergoing authoritative record determination 154 or otherwise interacting with the source data store 170A, and requests associated with segment 172C may be directed to the source data store 170A without undergoing authoritative record determination 154 or otherwise interacting with the destination data store 170B.

To perform record reading 152 for a record in the segment 172B currently being migrated, the migration router 150 may use a component for authoritative record determination 154 to determine the authoritative instance of the record in the source 170A or destination 170B and return that authoritative instance to the requesting client. The authoritative instance may be determined based (at least in part) on status metadata. The status metadata may indicate whether a record associated with a given key is online, offline, or deleted in a particular data store. For example, if a record is marked as offline in the source 170A and online in the destination 170B, then the migration router 150 may determine that the destination has the authoritative instance and may provide the destination instance in the response to the request.

Similarly, to perform record updating 156 for existing records in the segment 172B currently being migrated, the migration router 150 may determine the authoritative instance of the record in the source 170A or destination 170B using status metadata and may then perform the requested write or delete on that authoritative instance. For example, if a record is marked as offline in the source 170A and online in the destination 170B, then the migration router 150 may determine that the destination has the authoritative instance and may write to that destination instance. If a record is in the process of being migrated (e.g., the record is offline in the source and not available in the destination), then a request to access that record may produce a retriable error, such that the resulting error response may prompt the client to resend the request at a later time when the request is likely to succeed. Using the techniques described herein, an individual record may be subject to a micro-outage during migration of that record, but the remainder of the data set may remain available during that micro-outage. Because the authority for records may be flipped from the source 170A to the destination 170B on a record-by-record basis, the entire data set need not be made unavailable to application(s) 192 during a data-set-wide authority flip.

The migration router 150 may include a component for new record insertion 158 that publishes new records to the data set. As discussed above, the key for a request 194 may be hashed to determine the segment to which the request belongs. If the key belongs to the segment 172A, then the record may be published to the destination data store 170B. If the key belongs to the segment 172C, then the record may be published to the source data store 170A. If the key belongs to the segment 172B, then the record may be published to either the source destination store 170A or the destination data store 170B according to an insertion dialup rate 159. To perform insertions of new records for the segment 172B as specified in requests 194 from the client application(s) 192, the migration router 150 may select the source data store 170A or destination data store 170B on a request-by-request basis. The source 170A or destination 170B may be selected for a given insertion according to an insertion dialup rate 159. For example, if the insertion rate 159 is 50%, then approximately half of all new record insertions may be performed in the source 170A while the other half may be performed in the destination 170B. As another example, if the insertion rate 159 is 80%, then approximately 20% of all new record insertions may be performed in the source 170A while the remaining 80% may be performed in the destination 170B. In one embodiment, keys or other metadata associated with the insertion requests may be hashed, and the hash space may be partitioned according to the insertion rate 159. For example, if the insertion rate is currently 80%, then 80% of the hash space may represent keys to be published to the destination 170B, while the remaining 20% of the hash space may represent keys to be published to the source 170A.

The insertion dialup rate 159 may be automatically modified from time to time based on performance metrics (e.g., for the affected data stores). In one embodiment, the insertion rate 159 for a given segment may be incrementally increased one or more times until the rate is 100%, such that all new insertions for that segment are performed in the destination 170B. In one embodiment, the migration 120 of a segment may not be considered complete until the insertion rate 159 is 100% and there are no remaining records in the segment to move from the source 170A. In some embodiments, the performance metrics associated with the insertion dialup rate 159 may relate to the processor utilization, memory utilization, storage utilization, network utilization, and/or error rate of components such as data stores 170A-170B. For example, the insertion rate 159 may be incrementally reduced (dialed down) if metrics indicate that the destination 170B is insufficiently available for new insertions. As another example, the insertion rate 159 may be incrementally increased (dialed up) if metrics indicate that the destination 170B has available capacity for additional insertions. In one embodiment, the insertion rate 159 may be determined based (at least in part) on a client-specified deadline for completing the migration, a predetermined schedule for rate increases, and/or other suitable criteria. By dialing up or dialing down the insertion rate 159 in the manner described herein, the system 100 may adapt the migration 120 to the characteristics of the data stores 170A-170B and/or data set.

In one embodiment, the live migration system 100 may perform a rollback that returns the complete data set to the source 170A, as if the migration 120 had not been performed. In one embodiment, the rollback may be performed based (at least in part) on manual intervention by a user, e.g., a user associated with the client(s) 190. For example, the user may invoke an application programming interface (API) or enter user input into a user interface in order to initiate the rollback. In one embodiment, the rollback may be performed based (at least in part) on automated intervention by the system 100 itself. For example, a component of the system 100 (such as a control plane) may initiate a rollback in response to observing a high error rate in the migration 120 or determining that performance metrics for the destination 170B are sufficiently poor (e.g., with respect to a predetermined threshold). The rollback may be performed using the techniques described herein for record-by-record migration 120 by segment, but in the opposite direction. Records may be copied from the destination 170B to the source 170A on a record-by-record basis as discussed for the migration 120, e.g., with the status of the local instance being updated to "offline" in the destination and "online" in the source when migrating an individual record. During the rollback, the migration router 150 may continue to perform authoritative record determination 154 for reads 152 and updates 158. During the rollback, the migration router 150 may reduce the insertion dialup rate 159 to 0%, either incrementally or all at once, such that new insertions are performed in the source 170A and not the destination 170B.

In some embodiments, the data stores 170A-170B may use persistent storage resources such as hard disk drives, solid-state drives, and so on. The data stores 170A-170B may offer storage in a manner independent of each other. The data stores 170A-170B may use different underlying storage technologies, architectures, and/or resource types to store data. The data stores 170A-170B may be accessible via different application programming interfaces (APIs). For example, data objects may be added to data store 170A via a first set of one or more APIs, and data objects may be added to data store 170B via a second set of one or more APIs that differ in some way from the first set. The data stores 170A-170B may be hosted in the same or different geographical regions. In some embodiments, the data stores 170A-170B may be maintained by different business entities or service providers. In some embodiments, the data stores 170A-170B may be maintained by different divisions within a single business entity or enterprise.

In one embodiment, one or more of the data stores 170A-170B may represent a distributed hash table (DHT). In one embodiment, the data stores 170A-170B may include non-relational key-value data stores (e.g., NoSQL stores) that store key-value pairs. In one embodiment, the data stores 170A-170B may include relational data stores. In order to be usable with the system 100, the data stores 170A-170B may satisfy a minimal set of requirements, such as offering APIs for getting a value by key, putting a value by key, conditionally putting a value by key, and deleting a key-value pair. The data stores 170A-170B may differ in their performance characteristics. For example, one data store may represent a hot storage tier with lower latency, while another data store may represent a cold storage tier with higher latency but lower cost and a longer storage window. In one embodiment, one or more of the data stores 170A-170B may represent a hosted data storage solution offering security, speed, availability, reliability, and scalability. In one embodiment, one or more of the data stores 170A-170B may be offered as a storage service available to many clients (internal to an enterprise and/or external to the enterprise). The data stores 170A-170B may scale to handle a very large amount of data, and a fleet of hosts that implement the live migration system 100 may also scale to handle such data.

The live migration system 100 may be implemented using one or more services. Each of the services may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. This modularity may enable services to be reused in order to build various applications through a process referred to as orchestration. A service may include one or more components that may also participate in the distributed system, e.g., by passing messages to other services or to other components within the same service. A service may offer one or more application programming interfaces (APIs) or other programmatic interfaces through which another service may request the functionality of the service. Components of the live migration system 100, such as the data migrator 110 and/or migration router 150, may be configured to process requests from various internal or external systems, such as client computer systems 190 or computer systems consuming networked-based services (e.g., web services). For instance, an application 192 on a client computer system 190 may submit a request to read a record from the data set being migrated, and that request may be directed to the migration router 150 via the universal router 180. Services may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP).

Figure 13:
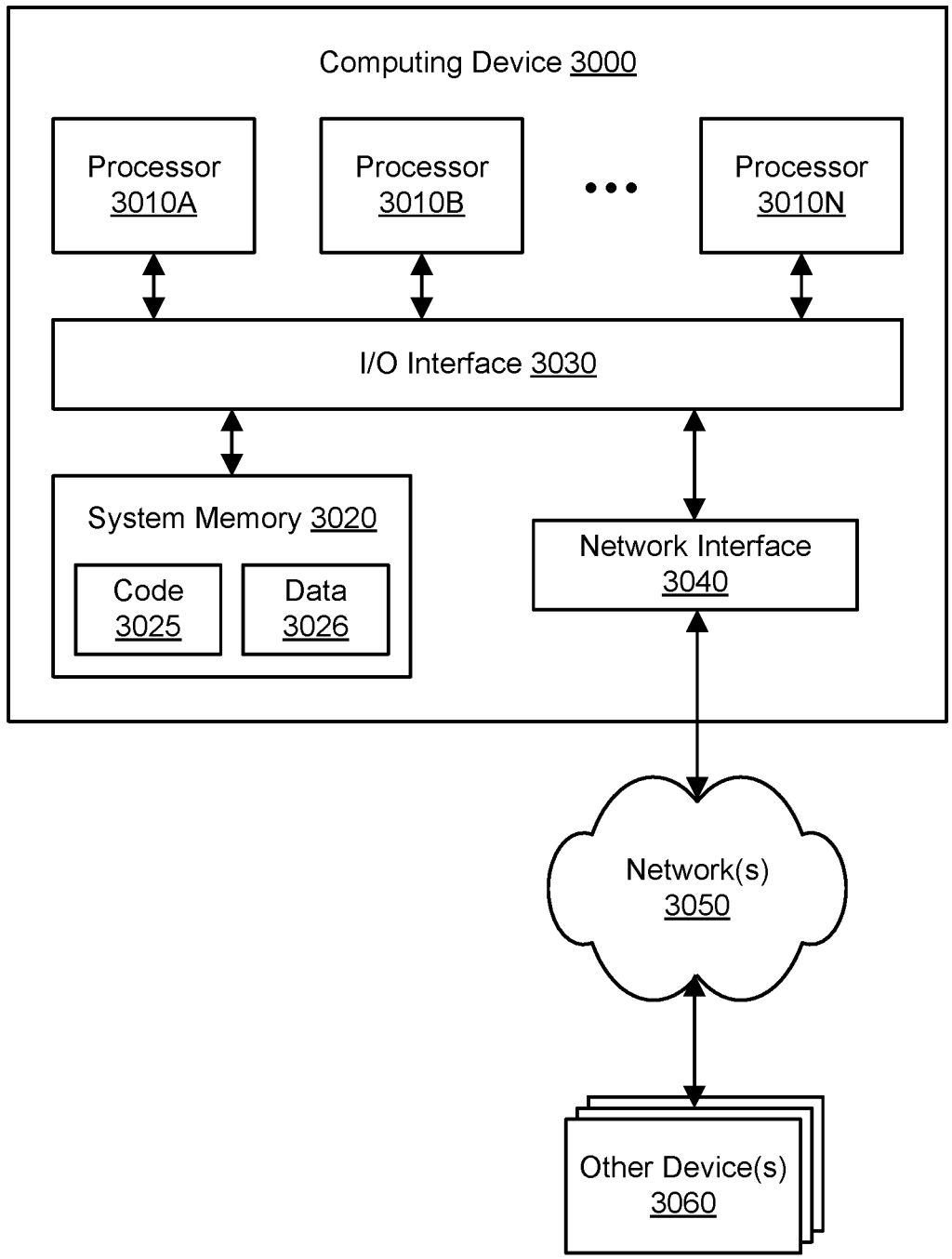
FIG. 13 illustrates an example computing device that may be used in some embodiments.

The live migration system 100 may include one or more computing devices, any of which may be implemented by the example computing device 3000 illustrated in FIG. 13. For example, the data migrator 110 may be implemented using one or more computing devices, and that number of devices may scale up or down according to the needs of a particular migration (e.g., the size of the segment 172B and/or migration dialup rate 121). In various embodiments, the functionality of the different services, components, and/or modules of the live migration system 100 may be provided by the same computing device or by different computing devices. If any of the various components are implemented using different computing devices, then the respective computing devices may be communicatively coupled, e.g., via a network. Each of the components of the live migration system 100 may represent any combination of software and hardware usable to perform their respective functions, as discussed as follows. Functions implemented by the live migration system 100 may be performed automatically, e.g., without a need for user initiation or user intervention after an initial configuration stage, and programmatically, e.g., by execution of program instructions on at least one computing device. In one embodiment, aspects of the live migration system 100 may be performed repeatedly over time. The live migration system 100 may include additional components not shown, fewer components than shown, or different combinations, configurations, or quantities of the components shown.

The migration router 150 may be implemented using a plurality of different instances that are distributed throughout one or more networks, and each instance may offer access to the functionality of a live request router to various clients 190 (via the universal router 180). An individual instance of the router 150 may be implemented using one host or a plurality of hosts, any of which may be implemented by the example computing device 3000 illustrated in FIG. 13. The number of hosts may scale up or down according to the needs of a particular migration (e.g., the size of the segment 172B and/or volume of requests 194). Similarly, any of the data stores 170A-170B may represent one or more service instances and may be implemented using one host or a plurality of hosts, any of which may be implemented by the example computing device 3000 illustrated in FIG. 13. The hosts may be located in any suitable number of data centers or geographical locations. In one embodiment, multiple services and/or instances of the same service may be implemented using the same host.

It is contemplated that any suitable number and configuration of clients 190 may interact with the services of the live migration system 100. Components shown in FIG. 1 may convey network-based service requests to one another via one or more networks. In various embodiments, the network(s) may encompass any suitable combination of networking hardware and protocols necessary to establish network-based communications between two services. For example, the network(s) may generally encompass the various telecommunications networks and service providers that collectively implement the Internet. The network(s) may also include private networks such as local area networks (LANs) or wide area networks (WANs) as well as public or private wireless networks. The network(s) may include the hardware (e.g., modems, routers, switches, load balancers, proxy servers, etc.) and software (e.g., protocol stacks, accounting software, firewall/security software, etc.) necessary to establish a networking link between a first component and the Internet as well as between the Internet and a second component. In some embodiments, components may communicate with one another using a private network rather than the public Internet.

In one embodiment, aspects of the live migration system 100 may be implemented using computing resources of a provider network. A provider network may represent a network set up by an entity such as a company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 2A:
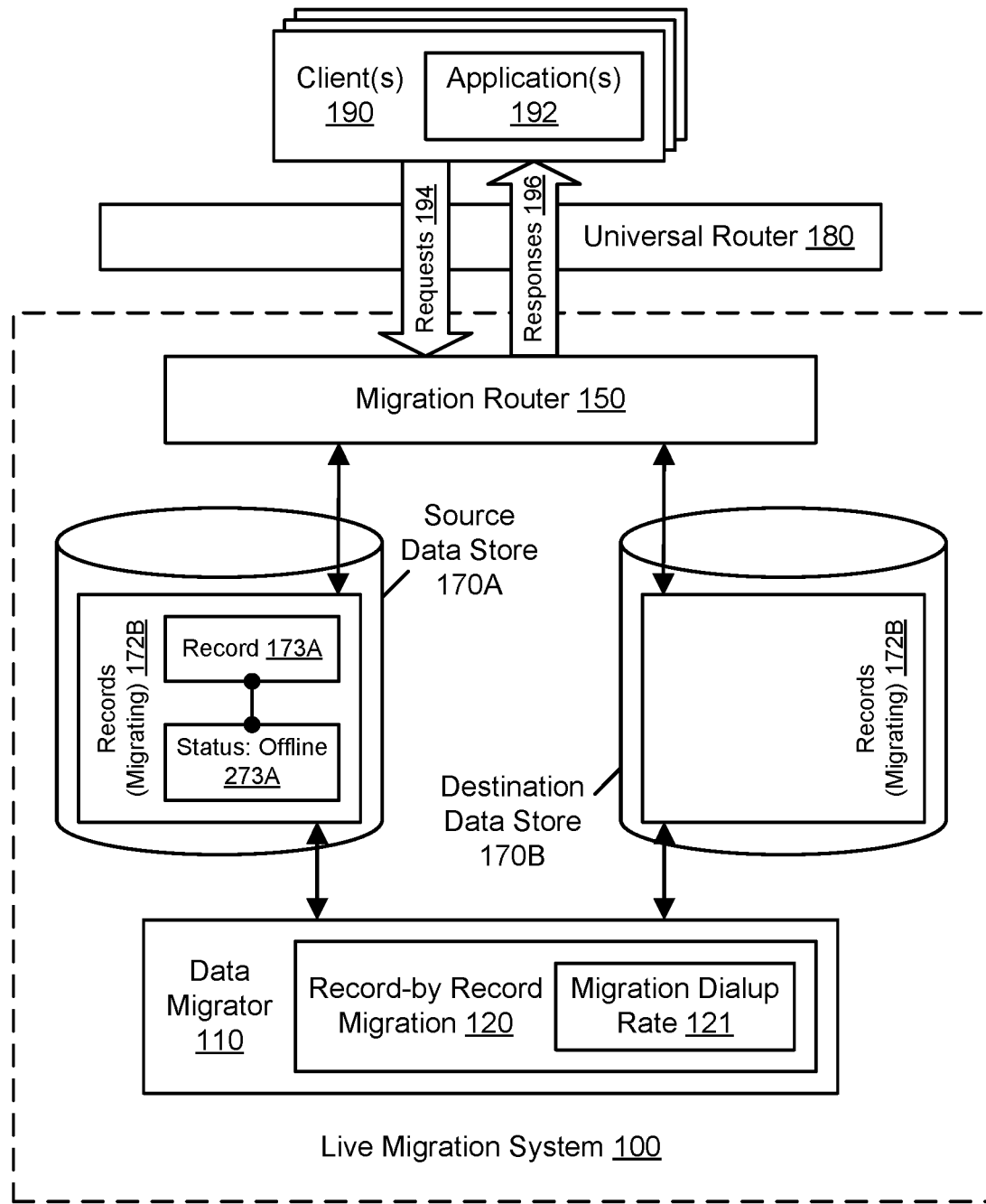
FIG. 2A, FIG. 2B, and FIG. 2C illustrate further aspects of the example system environment for record-by-record live migration using segmentation, including the migration of a single record, according to some embodiments.
Figure 2B:
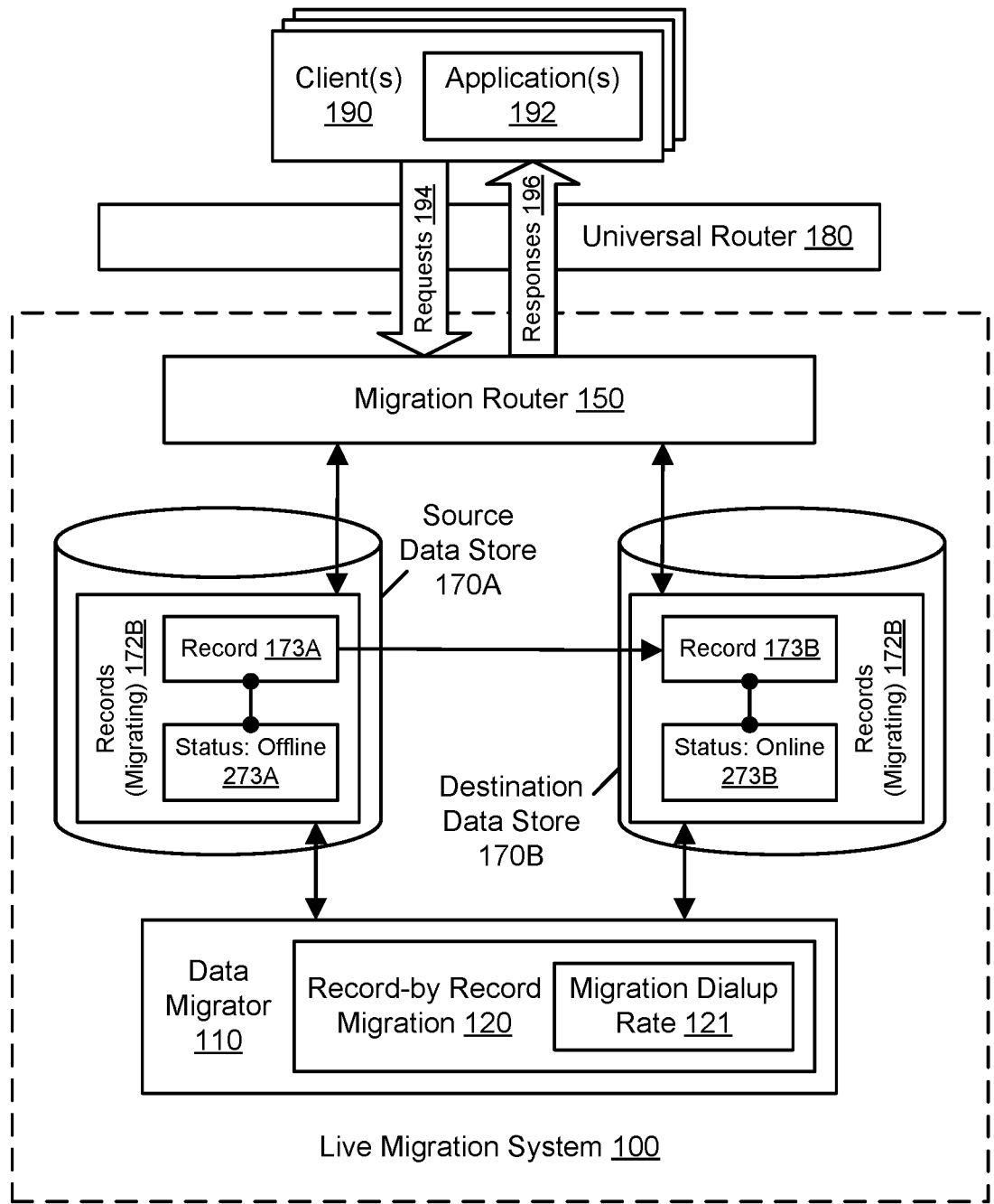
Figure 2C:
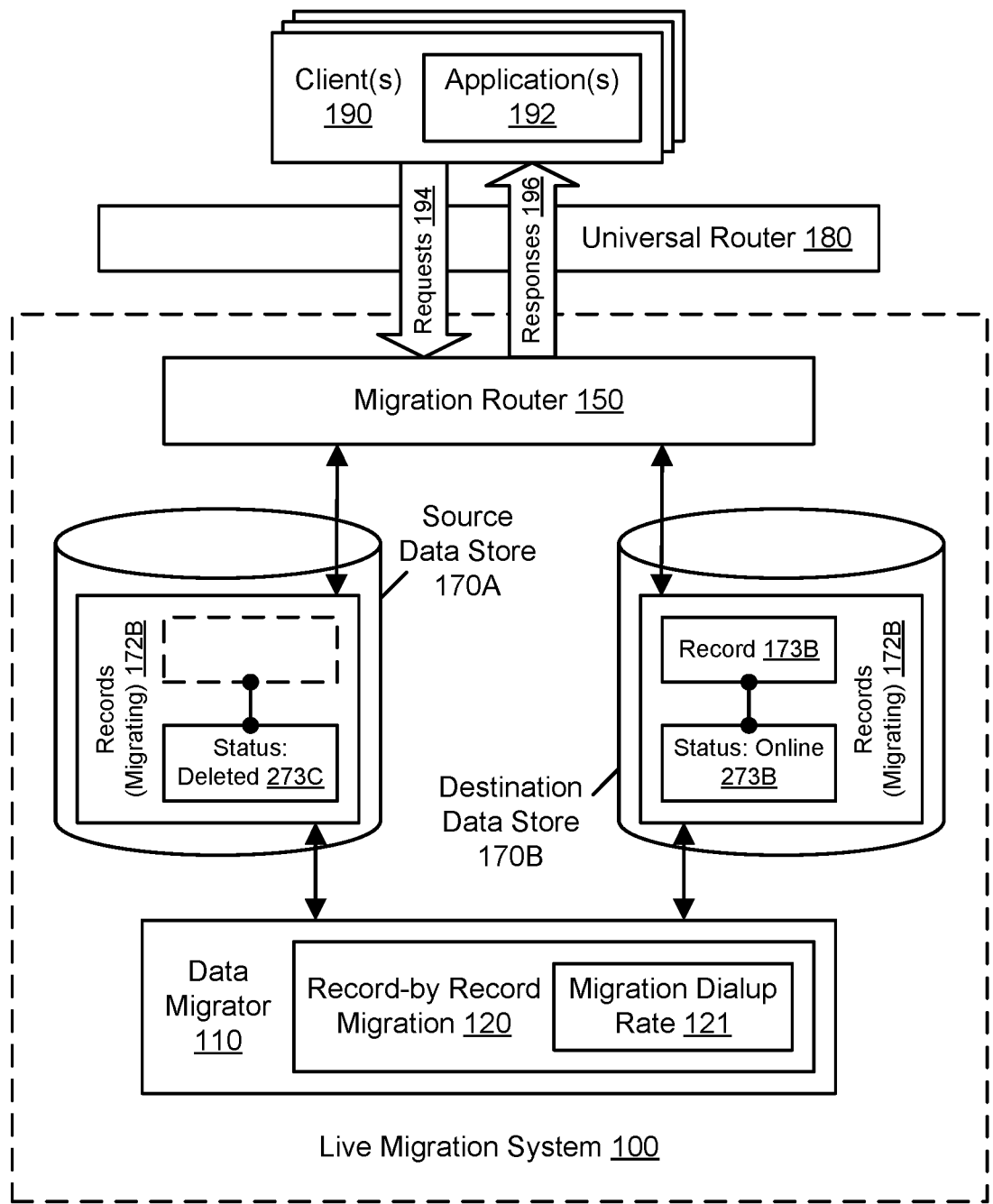

FIG. 2A, FIG. 2B, and FIG. 2C illustrate further aspects of the example system environment for record-by-record live migration using segmentation, including the migration of a single record, according to some embodiments. As discussed above, using the record-by-record migration 120, the data migrator 110 may migrate the segment 172B from the source 170A to the destination 170B on a record-by-record basis. As shown in the example of FIG. 2A, to migrate an individual record 173A, the migrator 110 may mark the record as being "offline" in the source 170A. The offline status 273A may be associated with a key that identifies the record 173A. The offline status 273A may be stored in the source data store 170A (as shown in FIG. 2A) or may be stored externally, e.g., in a repository that the migration router 150 can access.

As shown in the example of FIG. 2B, to continue the migration of the individual record 173A, the migrator 110 may store an instance 173B of the record in the destination 170B. On or after storing the instance 173B, the migrator 110 may mark the destination instance of the record 173B as being "online" in the destination 170B. The online status 273B may be associated with a key that identifies the record 173B. The online status 273B may be stored in the destination data store 170B (as shown in FIG. 2B) or may be stored externally, e.g., in a repository that the migration router 150 can access.

As shown in the example of FIG. 2C, to complete the migration of the individual record 173, the migrator 110 may delete the instance 173 from the source 170A. On or after deleting the instance 173A, the migrator 110 may mark the source instance of the record 173A as being "deleted" in the source 170A. The deleted status 273C may be associated with a key that identifies the record 173A and may represent a "tombstone" for that key. The deleted status 273C may be stored in the source data store 170A (as shown in FIG. 2C) or may be stored externally, e.g., in a repository that the migration router 150 can access. In one embodiment, the instance 173A may be deleted in the source, but the deleted status 273C may not be stored. However, the migration router 150 may be able to correctly identify the authoritative instance based on the online status 273B in the destination and the absence of any corresponding record in the source 170A.

Figure 3:
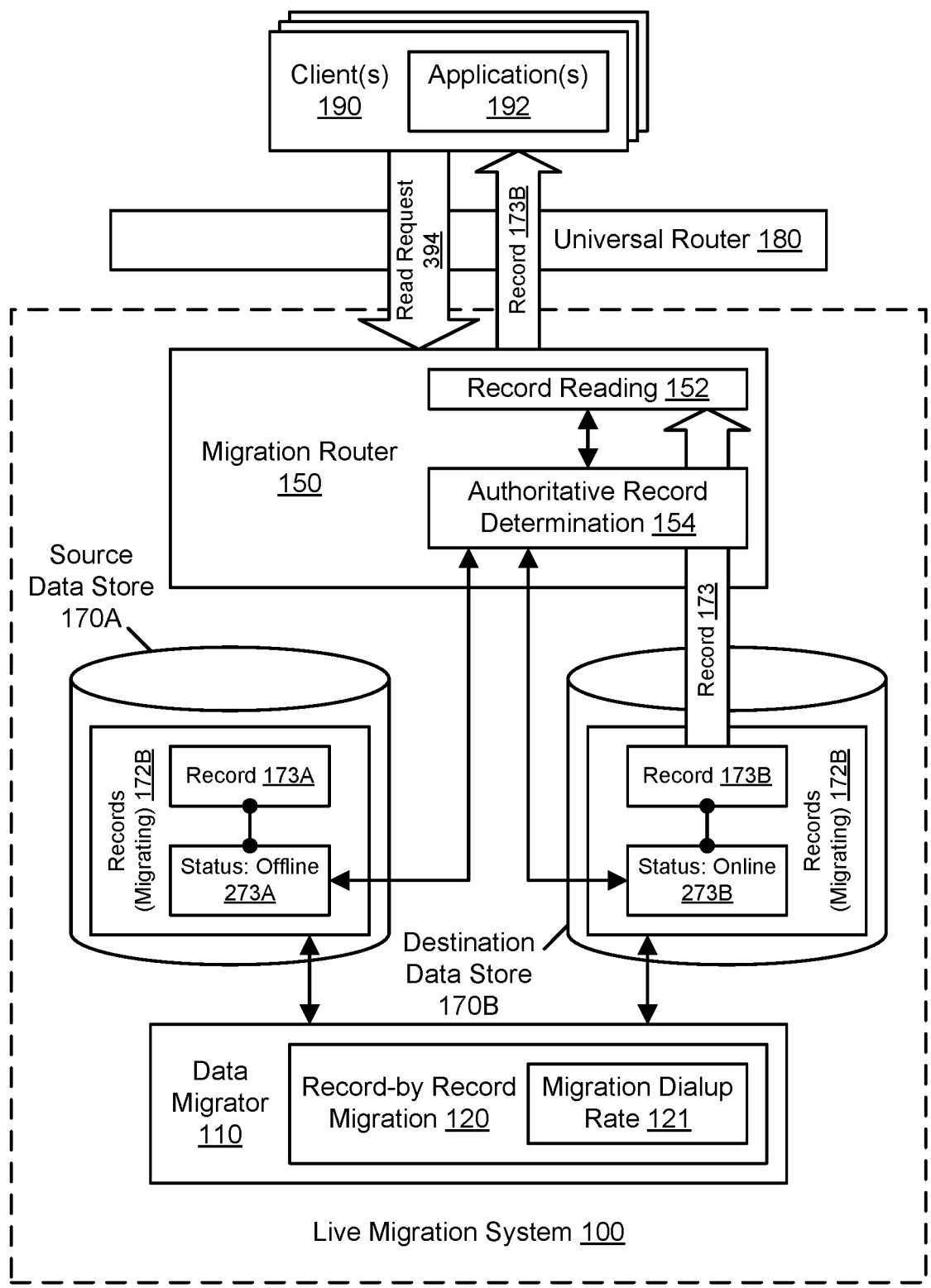
FIG. 3 illustrates further aspects of the example system environment for record-by-record live migration using segmentation, including a migration router that processes a read request using both the source and destination data stores, according to some embodiments.

FIG. 3 illustrates further aspects of the example system environment for record-by-record live migration using segmentation, including a migration router that processes a read request using both the source and destination data stores, according to some embodiments. During the migration 120, the migration router 150 may accept data access requests 194 such as read request 394. The read request 394 may represent a request for a client to obtain a record associated with a particular key and belonging to the segment 172B currently being migrated. To perform the requested record reading 152, the migration router 150 may use a component for authoritative record determination 154 to determine the authoritative instance of the record in the source 170A or destination 170B and return that authoritative instance to the requesting client. The authoritative instance may be determined based (at least in part) on status metadata obtained by the migration router 150 from one or more of the data stores 170A-170B. As discussed with respect to FIG. 2A, FIG. 2B, and FIG. 2C, the status metadata may indicate whether a record associated with a given key is online, offline, or deleted in a particular data store or whether the data store returned an error or an indication that the key was not found. For example, as shown in FIG. 3, at the point in the migration 120 when the read request 394 is processed, the status 273A of the record 173A in the source 170A is "offline," and the status 273B of the record 173B in the destination 170B is "online." If one instance of a record is offline and another instance is online, then the component for authoritative record determination 154 may determine that the online instance is authoritative. Accordingly, as shown in FIG. 3, the migration router 150 may return the destination instance 173B to the client(s) 190 as the authoritative instance of the requested record.

In one embodiment, the destination instance 173B may be deemed authoritative for reads if the status in the source 170A is offline or not found (e.g., with an error or "count:0" response from the data store) while the status 273B in the destination 170B is "online." In one embodiment, the source instance 173A may be deemed authoritative for reads if the status in the source 170A is "online" while the status 273B in the destination 170B is offline, or not found (e.g., with an error or "count:0" response from the data store). In some embodiments, other combinations of source status and destination status may result in an error or a determination that the record associated with the read request is offline (e.g., deleted). For example, if the record is marked as offline in both the source and the destination, an error may be returned. As another example, if the record is marked as online in both the source and the destination, an error may be returned. If the record is not found in either data store (e.g., with an error or "count:0" response from the data store), an error may be returned. If an attempt to obtain the record from one data store returns an error or "count:0" response, and the record is marked as deleted (tomb stoned) in the other data store, an error may be returned. If the record is offline in one data store and not found or has a "deleted" (tombstoned) status in the other data store, then the method may determine that the record is offline. The offline response may represent a retriable error such that the client may resubmit the request and expect it to be performed successfully at a later time. The retriable error may represent a micro-outage for an individual record during migration of that record, but the remainder of the data set may remain available during that micro-outage. Because the authority for records may be flipped from the source to the destination on a record-by-record basis, the entire data set need not be made unavailable to clients during a data-set-wide authority flip.

Figure 4:
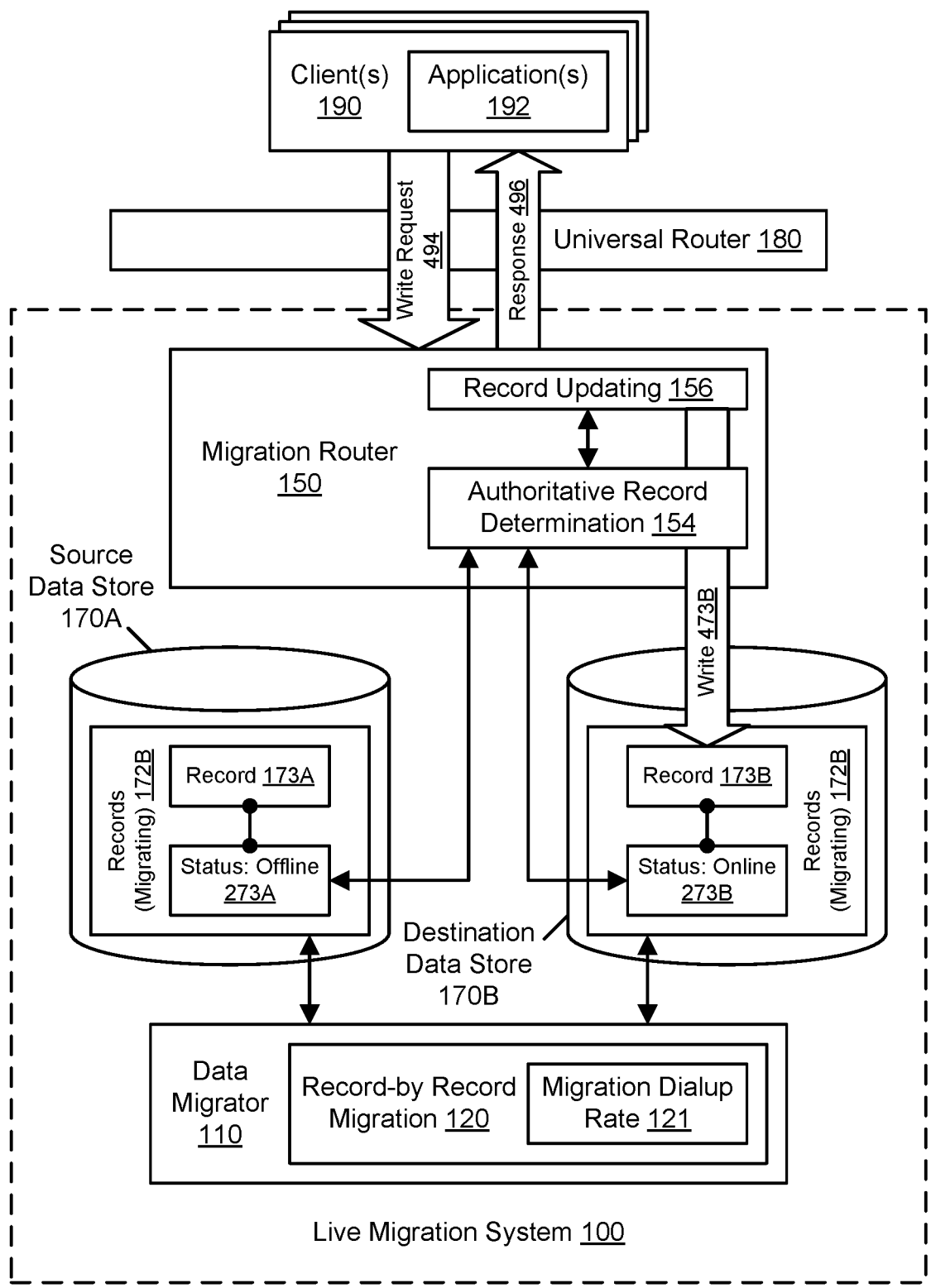
FIG. 4 illustrates further aspects of the example system environment for record-by-record live migration using segmentation, including a migration router that processes a write request using both the source and destination data stores, according to some embodiments.

FIG. 4 illustrates further aspects of the example system environment for record-by-record live migration using segmentation, including a migration router that processes a write request using both the source and destination data stores, according to some embodiments. During the migration 120, the migration router 150 may accept data access requests 194 such as write request 494. The write request 494 may represent a request for a client to write a payload to a record associated with a particular key and belonging to the segment 172B currently being migrated. To perform the requested record updating 156, the migration router 150 may use a component for authoritative record determination 154 to determine the authoritative instance of the record in the source 170A or destination 170B, write to that authoritative instance, and return a response 496 to the requesting client. The authoritative instance may be determined based (at least in part) on status metadata obtained by the migration router 150 from one or more of the data stores 170A-170B. As discussed with respect to FIG. 2A, FIG. 2B, and FIG. 2C, the status metadata may indicate whether a record associated with a given key is online, offline, or deleted in a particular data store or whether the data store returned an error or an indication that the key was not found. For example, as shown in FIG. 4, at the point in the migration 120 when the write request 494 is processed, the status 273A of the record 173A in the source 170A is "offline," and the status 273B of the record 173B in the destination 170B is "online." If one instance of a record is offline and another instance is online, then the component for authoritative record determination 154 may determine that the online instance is authoritative. Accordingly, as shown in FIG. 4, the migration router 150 may perform the requested write 473B to the destination instance 173B as the authoritative instance of the requested record.

In one embodiment, the destination instance 173B may be deemed authoritative for writes if the status in the source 170A is offline or not found (e.g., with an error or "count:0" response from the data store) while the status 273B in the destination 170B is "online." In one embodiment, the source instance 173A may be deemed authoritative for reads if the status in the source 170A is "online" while the status 273B in the destination 170B is offline or not found (e.g., with an error or "count:0" response from the data store). In some embodiments, any other combination of source status and destination status may result in an error or a determination that the record associated with the write request is offline (e.g., deleted). For example, if the record is marked as offline in both the source and the destination, an error may be returned. As another example, if the record is marked as online in both the source and the destination, an error may be returned. If the record is not found in either data store (e.g., with an error or "count:0" response from the data store), an error may be returned. If an attempt to obtain the record from one data store returns an error or "count:0" response, and the record is marked as deleted (tombstoned) in the other data store, an error may be returned. If the record is offline in one data store and not found or has a "deleted" (tomb stoned) status in the other data store, then the method may determine that the record is offline. The offline response may represent a retriable error such that the client may resubmit the request and expect it to be performed successfully at a later time. The retriable error may represent a micro-outage for an individual record during migration of that record, but the remainder of the data set may remain available during that micro-outage. Because the authority for records may be flipped from the source to the destination on a record-by-record basis, the entire data set need not be made unavailable to clients during a data-set-wide authority flip.

Figure 5A:
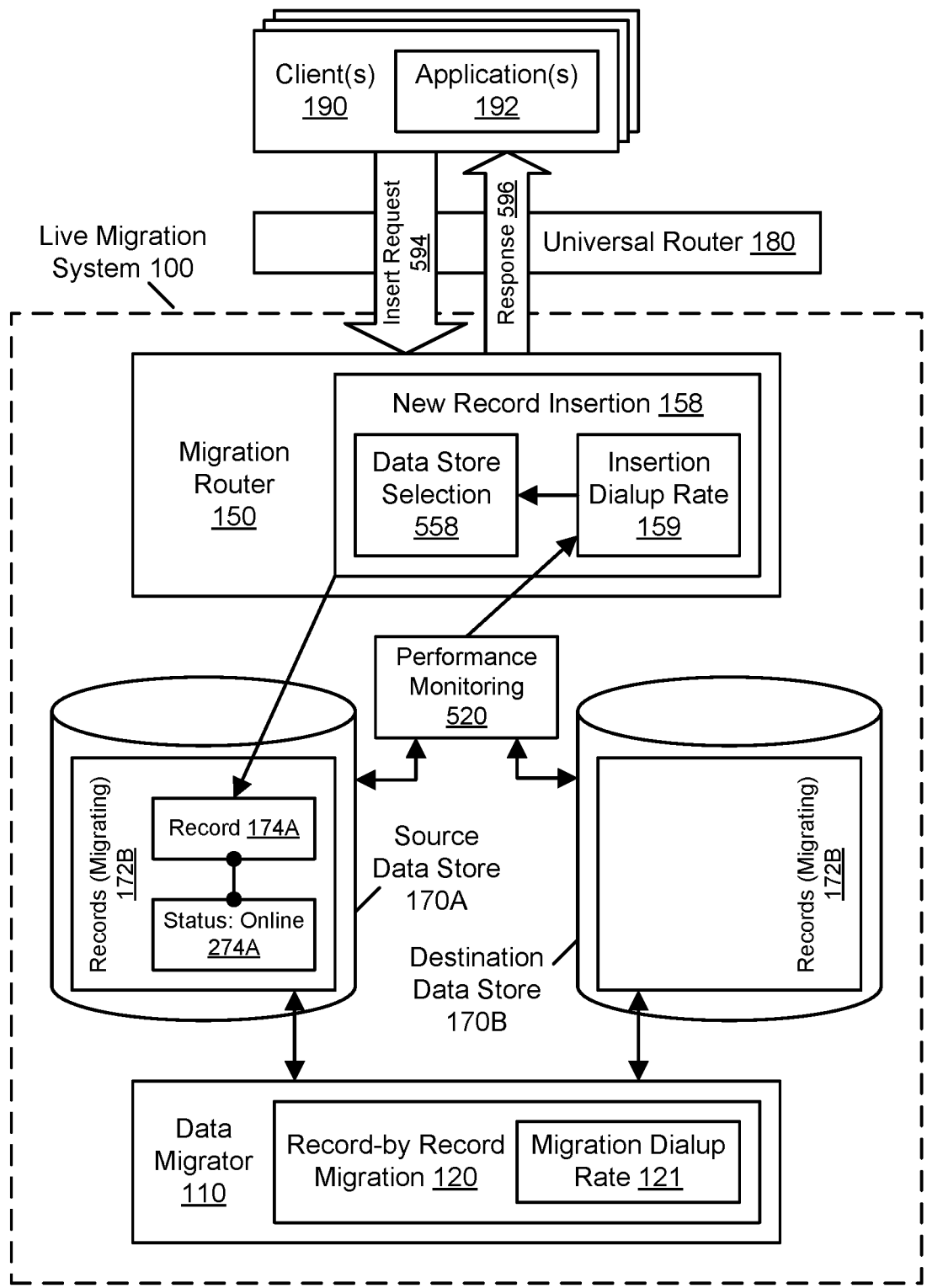
FIG. 5A and FIG. 5B illustrate further aspects of the example system environment for record-by-record live migration using segmentation, including a migration router that selects one of the data stores for insertion of a new record, according to some embodiments.
Figure 5B:
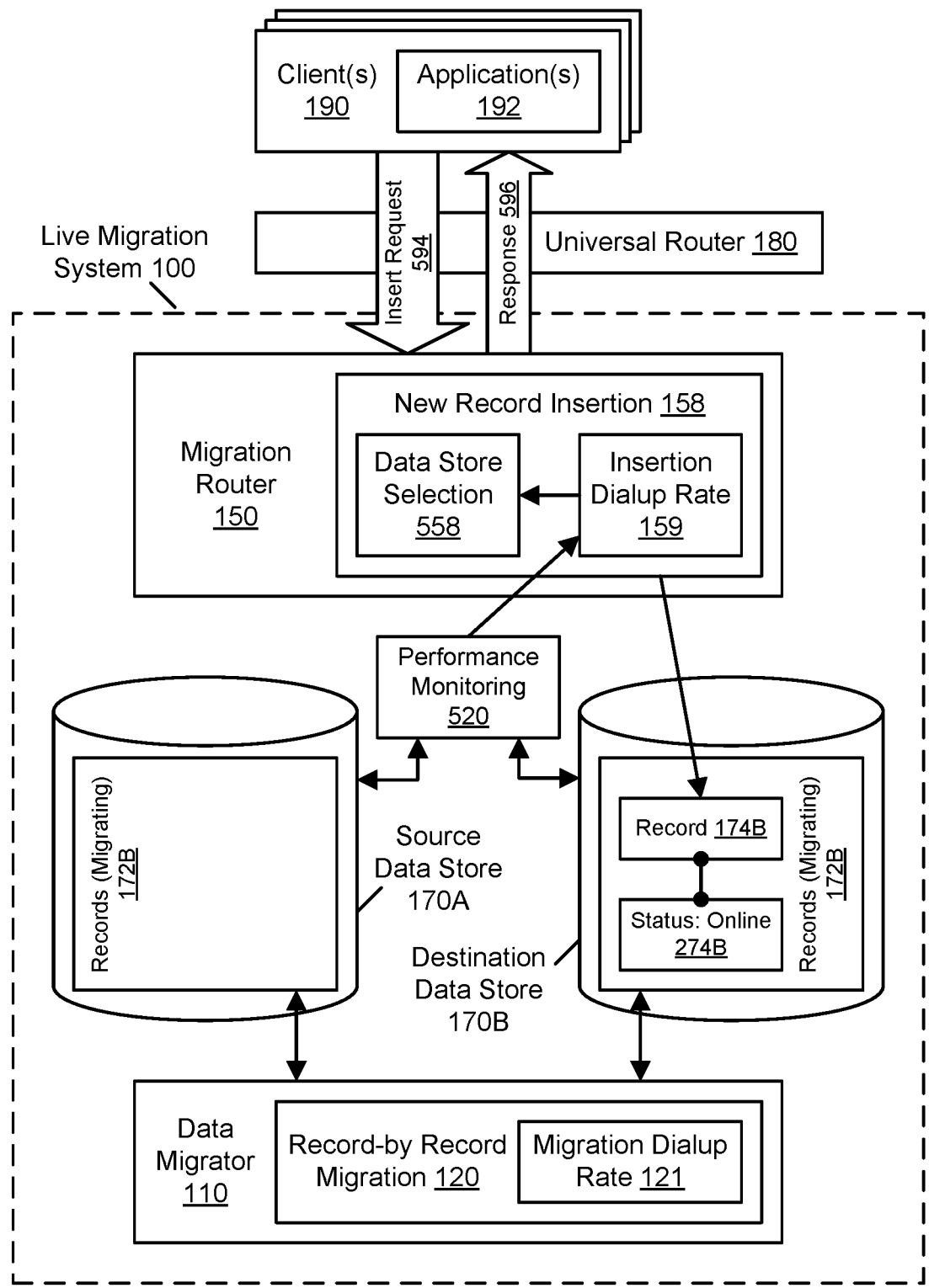

FIG. 5A and FIG. 5B illustrate further aspects of the example system environment for record-by-record live migration using segmentation, including a migration router that selects one of the data stores for insertion of a new record, according to some embodiments. During the migration 120, the migration router 150 may accept data access requests 194 such as insert (or insertion) request 594. The insert request 594 may represent a request for a client to write a payload to a new record associated with a particular key and belonging to the segment 172B currently being migrated. As discussed above, the migration router 150 may include a component for new record insertion 158 that writes new records to the data set. To perform an insertion of a new record to the migrating segment 172B as specified in request 594, the migration router 150 may perform data store selection 558. The data store selection 558 may select the source data store 170A or destination data store 170B on a request-by-request basis. As shown in the example of FIG. 5A, the source data store 170A may be selected for insertion of a new record 174A with "online" status 274A. As shown in the example of FIG. 5B, the destination data store 170B may be selected for insertion of a new record 174B with "online" status 274B. Upon successfully performing the insertion, the migration router 150 may return a response 596 to the requesting application. The response 596 may not indicate which of the data stores 170A-170B was selected but may instead indicate that the insertion was successful.

The source 170A or destination 170B may be selected for a given insertion based (at least in part) on an insertion dialup rate 159. For example, if the insertion rate 159 is 50%, then approximately half of all new record insertions may be performed in the source 170A while the other half may be performed in the destination 170B. As another example, if the insertion rate 159 is 80%, then approximately 20% of all new record insertions may be performed in the source 170A while the remaining 80% may be performed in the destination 170B. In one embodiment, keys or other metadata associated with the insertion requests may be hashed, and the hash space may be partitioned according to the insertion rate 159. For example, if the insertion rate is currently 80%, then 80% of the hash space may represent keys to be published to the destination 170B, while the remaining 20% of the hash space may represent keys to be published to the source 170A. Using this technique, new records may be deterministically inserted into the source or destination based (at least in part) on hashing the keys or other attributes of the records.

The insertion rate 159 may be incrementally dialed up during the migration 120 to ensure that the destination 170B is able to handle the insertion workload. The insertion dialup rate 159 may be automatically modified based (at least in part) on performance monitoring 520 that captures and/or analyzes one or more performance metrics. In some embodiments, the performance metrics associated with the insertion dialup rate 159 may relate to the processor utilization, memory utilization, storage utilization, network utilization, and/or error rate of components such as data stores 170A-170B. For example, the insertion rate 159 may be incrementally reduced (dialed down) if metrics indicate that the destination 170B is insufficiently available for new insertions. As another example, the insertion rate 159 may be incrementally increased (dialed up) if metrics indicate that the destination 170B has available capacity for additional insertions. In one embodiment, the insertion rate 159 may be determined based (at least in part) on a client-specified deadline for completing the migration, a predetermined schedule for rate increases, and/or other suitable criteria. In one embodiment, the insertion rate 159 may be incrementally increased one or more times until the rate is 100%, such that all new insertions are performed in the destination 170B. In one embodiment, the migration 120 of a particular segment 172B may not be considered complete until the insertion rate 159 is 100% and there are no remaining records in that segment to move from the source 170A.

Figure 6:
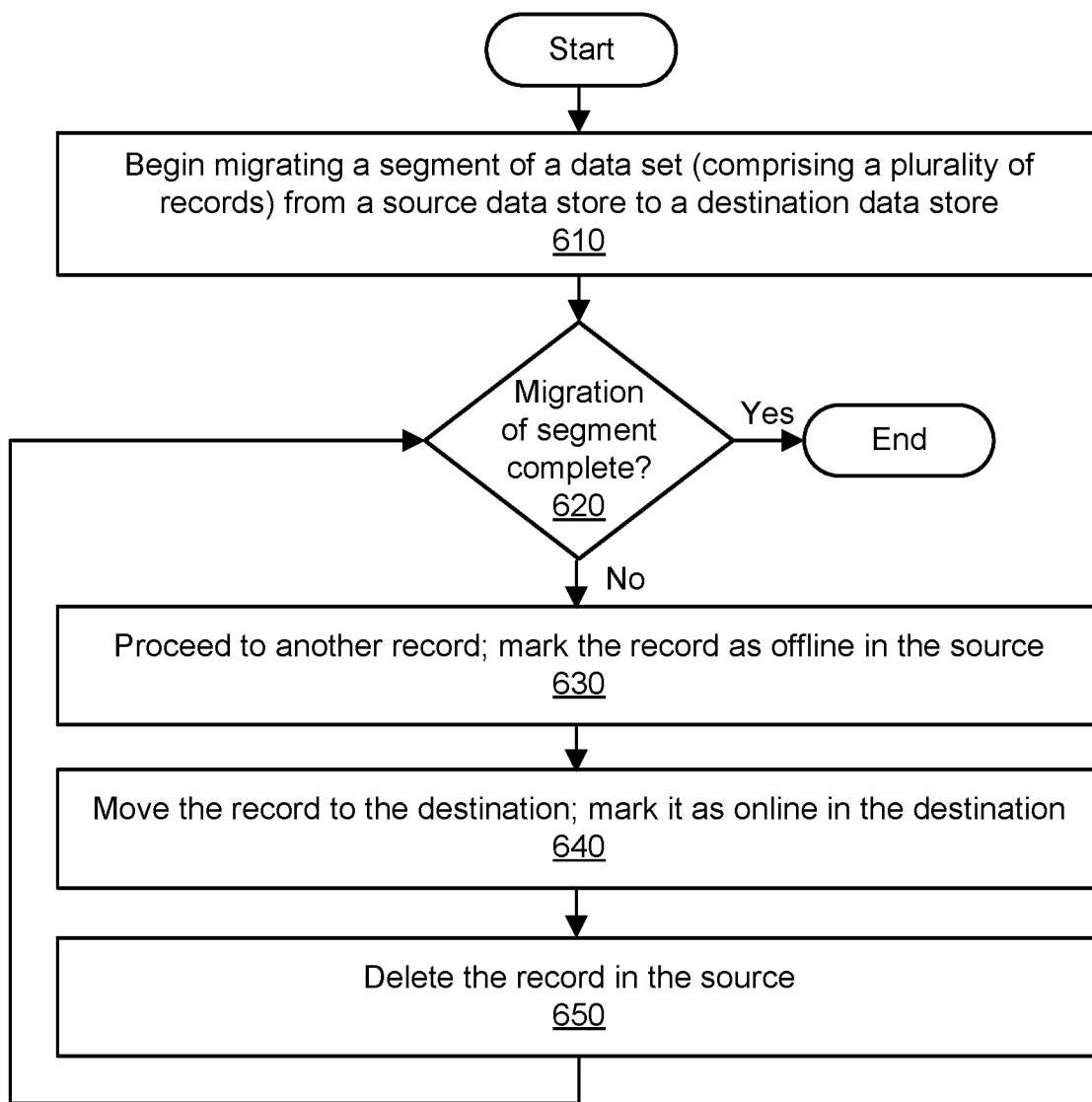
FIG. 6 is a flowchart illustrating a method for record-by-record live migration of a data set between data stores, according to some embodiments.

FIG. 6 is a flowchart illustrating a method for record-by-record live migration of a data set between data stores, according to some embodiments. As shown in 610, the method may begin migrating a segment of a data set from a source data store to a destination data store. The source and destination data stores may vary in their performance, availability, storage capacity, location, and/or other characteristics, and the migration may seek to take advantage of such characteristics offered by the destination data store. In one embodiment, a client of a live migration system may request migration of a particular data set from a source data store to a destination data store, e.g., by using an API or user interface of a control plane associated with the live migration system. In one embodiment, the live migration system itself may decide to initiate the migration in a manner transparent to the client, e.g., based on automated analysis of performance metrics. The data set may represent a table or other data structure that includes a plurality of records, rows, or other individual data elements. The data set may be divided into a plurality of segments. In one embodiment, keys or other metadata for individual records may be hashed using a hash function, and the hash space may be partitioned into the various segments such that an individual record belongs to one and only one segment. A data migrator of the live migration system may perform the migration on a segment-by-segment and record-by-record basis, such that the migration of one record may be independent of the migration of another record. Record-by-record migration may include migrating one record at a time or migrating a plurality of records concurrently. A fleet of migration workers running in parallel may implement the migration of individual records under the direction of an orchestrator that limits the rate of migration and provides keys to be migrated to workers, e.g., using queues. A migration rate may determine the maximum number of records that are migrated over a period of time. In one embodiment, the migration rate may not be permitted to exceed a predetermined threshold so that an excessive number of records are not unavailable due to migration at a given time.

In one embodiment, the migration of a segment may continue until one or more termination criteria are met. As shown in 620, the method may determine whether the migration is complete. If so, then the method may end. The migration may not be deemed complete until all the records in the segment in the source have been migrated. In one embodiment, the method may determine that all records in the segment have been migrated when the corresponding portion of the source table is empty or has a size of zero. If all the records in the segment in the source have not been migrated, then the method may continue with the operation shown in 630. In one embodiment, the migration of the segment may be deemed complete only after all new record inserts for the segment are being performed in the destination data store and not in the source data store. In one embodiment, the migration may be terminated and a rollback may be initiated automatically if particular criteria are met (e.g., an error rate exceeds a threshold, a performance metric for the destination is unsatisfactory, and so on) or manually if a user requests the termination and rollback.

As shown in 630, the method may proceed to another record and begin the migration of that record. Records in the source may be identified in a key discovery process and placed in one or more queues to provide the records to migration workers. To begin the migration, the record may be marked as "offline" in the source. The offline status may be associated with a key that identifies the record. The offline status may be stored in the source data store or may be stored externally, e.g., in a repository that the migration router can access.

As shown in 640, the method may store an instance of the record in the destination. On or after storing the instance, the destination instance of the record may be marked as being "online" in the destination. The online status may be associated with a key that identifies the record. The online status may be stored in the destination data store or may be stored externally, e.g., in a repository that the migration router can access.

As shown in 650, to complete the migration of the individual record, the method may delete the record from the source. On or after deleting the source instance, the method may mark the source instance of the record as being "deleted" in the source. The deleted status may be associated with a key that identifies the record. The deleted status may be stored in the source data store or may be stored externally, e.g., in a repository that the migration router can access. The data migrator may produce metrics related to the record-by-record migration, such as the success or failure of migration for individual records. The metrics may be used to control the rate of the migration, e.g., by automatically increasing the migration rate if previous migrations are sufficiently successful or automatically decreasing the migration rate if previous migrations are insufficiently successful. The method may return to the operation shown in 620 for termination or continuation of the migration.

Figure 7:
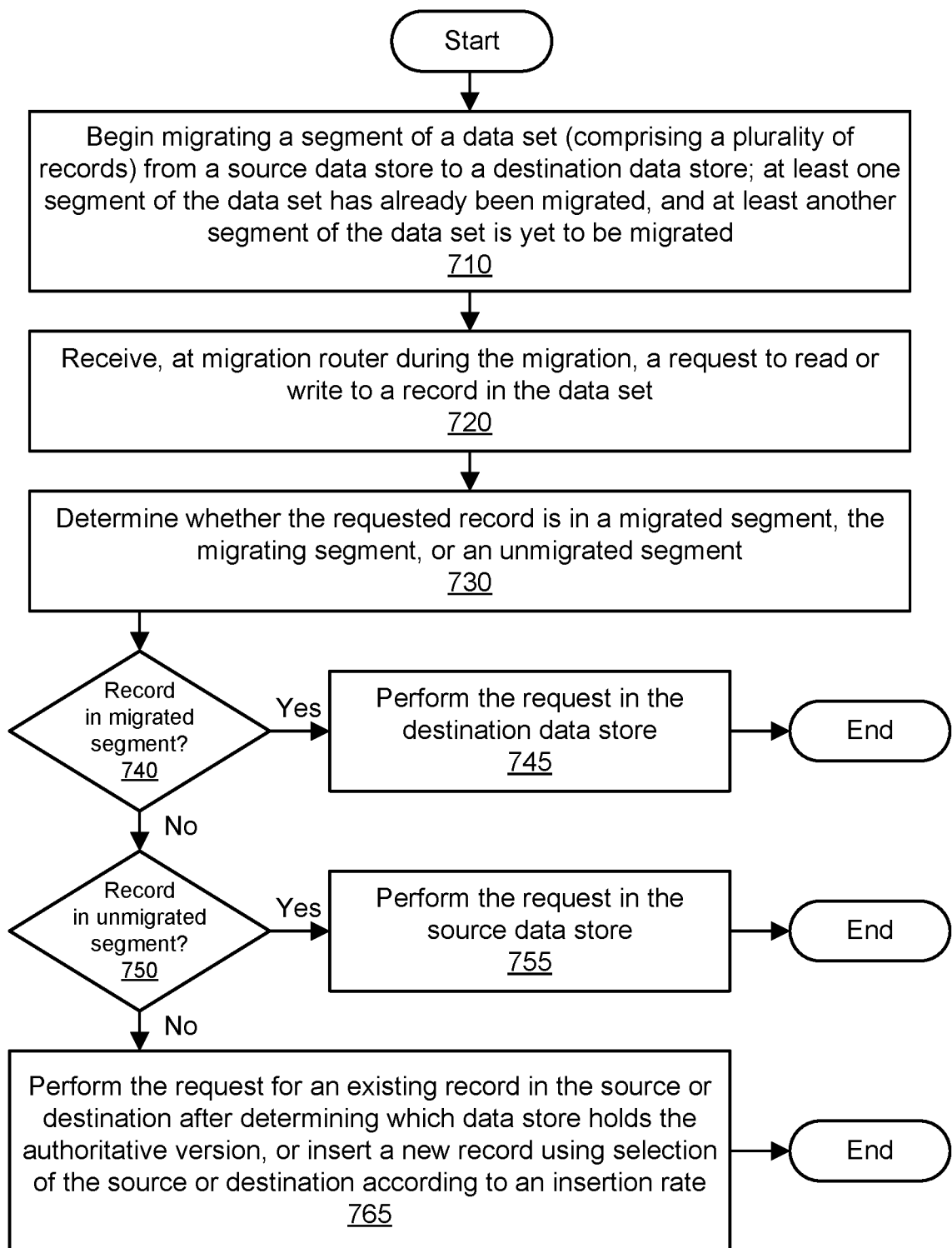
FIG. 7 is a flowchart illustrating a method for sliding window migration, according to some embodiments.

FIG. 7 is a flowchart illustrating a method for sliding window migration, according to some embodiments. As shown in 710, the method may begin migrating a segment of a data set from a source data store to a destination data store. The data set may be divided into a plurality of segments, such as the segment currently being migrated, one or more segments previously migrated, and one or more segments yet to be migrated. By migrating segment-by-segment, the method may migrate using a sliding window within the data set. In one embodiment, keys or other attributes for individual records may be hashed using a hash function, and the hash space may be partitioned into the various segments such that an individual record belongs to one and only one segment. In one embodiment, segments may be determined according to selection criteria. A data migrator of the live migration system may perform the migration on a segment-by-segment and record-by-record basis, such that the migration of one record may be independent of the migration of another record.

As shown in 720, during the migration, a migration router may receive, from a client, a request to read or write to a record in the data set. The method may process a request based (at least in part) on the segment to which the requested record belongs. In one embodiment, when a request is received, the sliding window migration may use a hash function to generate a hash of a key or other metadata associated with the requested record and determine a segment according to that hash. As shown in 730, the method may determine whether the record associated with the request is in a migrated segment, the segment currently being migrated, or a segment yet to be migrated. As shown in 740, if the record is in a migrated segment, then as shown in 745, the method may perform the request in the destination data store, e.g., without incurring overhead in referencing or using the source data store. As shown in 750, if the record is in an unmigrated segment, then as shown in 755, the method may perform the request in the source data store, e.g., without incurring overhead in referencing or using the destination data store.

As shown in 765, the record may belong to the segment currently being migrated. Because the migration is in process for the segment (and not completed or rolled back), individual records in the segment may vary in terms of whether the source data store or destination data store is authoritative for those records. Accordingly, the method may reference the status of an existing record in both the source and destination to determine how to proceed with the request. For example, if the record is online in the source only and offline, deleted, or not found (e.g., with an error or "count:0" response from the data store) in the destination, then the request may be performed using the authoritative instance of the record in the source. As another example, if the record is online in the destination only and offline, deleted, or not found (e.g., with an error or "count:0" response from the data store) in the source, then the request may be performed using the authoritative instance of the record in the destination. New insertions into the segment currently being migrated may be performed by selection of the source or destination according to an insertion dialup rate.

Figure 8:
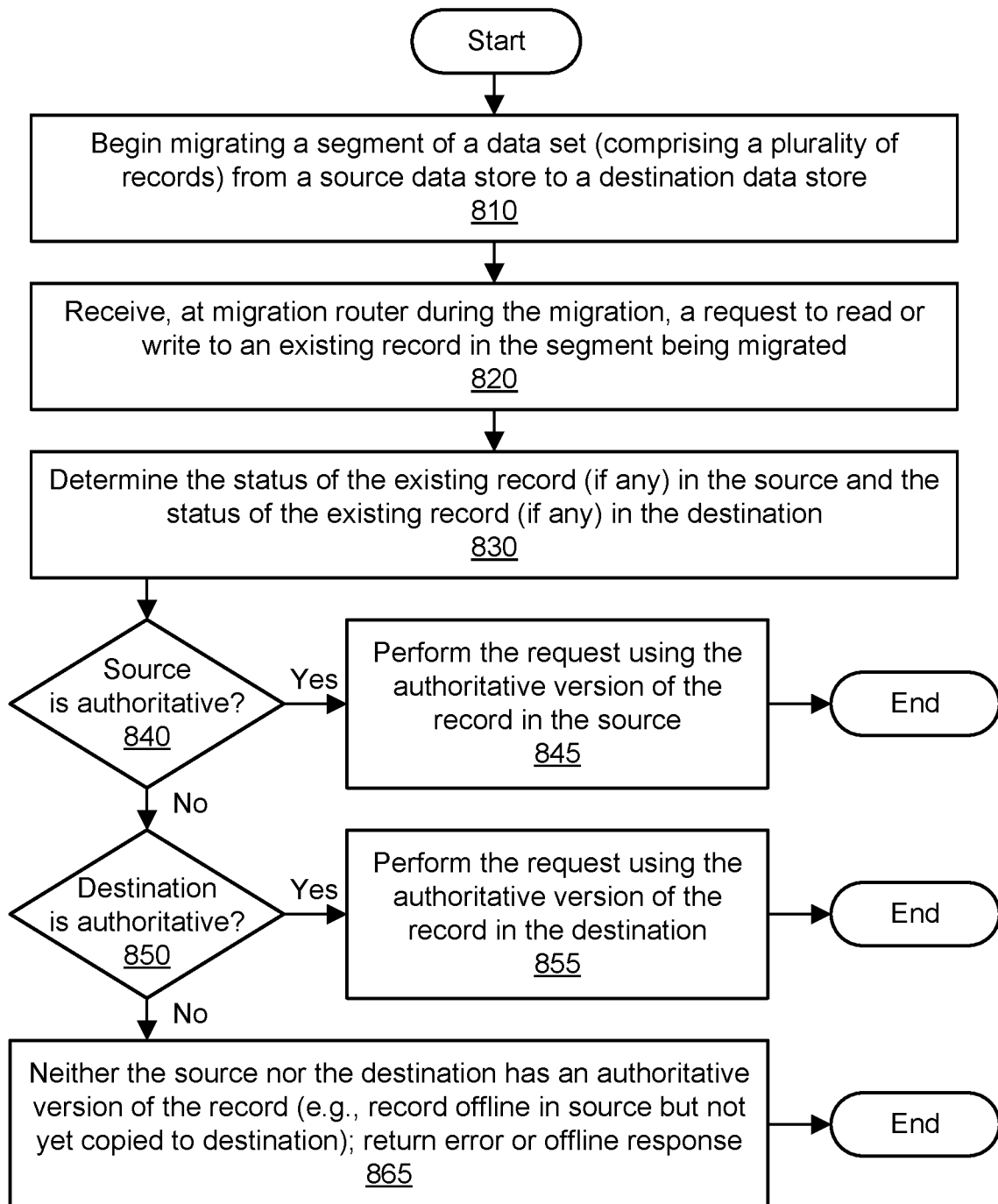
FIG. 8 is a flowchart illustrating a method for reading from or updating the data set during a migration, according to some embodiments.

FIG. 8 is a flowchart illustrating a method for reading from or updating the data set during a migration, according to some embodiments. As shown in 810, the method may begin migrating a segment of a data set from a source data store to a destination data store. The source and destination data stores may vary in their performance, availability, storage capacity, location, and/or other characteristics, and the migration may seek to take advantage of such characteristics offered by the destination data store. In one embodiment, a client of a live migration system may request migration of a particular data set from a source data store to a destination data store, e.g., by using an API or user interface of a control plane associated with the live migration system. In one embodiment, the live migration system itself may decide to initiate the migration in a manner transparent to the client, e.g., based on automated analysis of performance metrics. The data set may represent a table or other data structure that includes a plurality of records, rows, or other individual data elements. A data migrator of the live migration system may perform the migration on a record-by-record basis, such that the migration of one record may be independent of the migration of another record. Record-by-record migration may include migrating one record at a time or migrating a plurality of records concurrently. A fleet of migration workers running in parallel may implement the migration of individual records.

As shown in 820, during the migration, a migration router may receive, from a client, a request to read or write to an existing record in the segment currently being migrated. Because the migration of the segment is in process and not completed or rolled back, individual records may vary in terms of whether the source data store or destination data store is authoritative for those records. Accordingly, the router may reference the status of the record in both the source and destination to determine how to proceed with the request.

As shown in 830, the method may determine the status of the record (if any) in the source and the status of the record (if any) in the destination. In one embodiment, the status information (e.g., online, offline, or deleted) may be stored in the data store itself, e.g., as metadata tied to the key that identifies the record. In one embodiment, the status information may be stored using an external service or other repository that is accessible to the migration router. Based (at least in part) on the status of the record (if available) in the source and the status of the record (if available) in the destination, the method may determine the authoritative instance of the record in the source or destination and proceed to perform the request using that authoritative instance.

As shown in 840, the method may determine whether the record is online in the source only and offline, deleted, or not found (e.g., with an error or "count:0" response from the data store) in the destination. If so, then as shown in 845, the request may be performed using the authoritative instance of the record in the source. As shown in 850, the method may determine whether the record is online in the destination only and offline, deleted, or not found (e.g., with an error or "count:0" response from the data store) in the source. If so, then as shown in 855, the request may be performed using the authoritative instance of the record in the destination. Performing the request may include writing the requested payload to the record for a write request or reading and returning the record for a read request.

In some embodiments, as shown in 865, any other combination of source status and destination status may result in an error or a determination that the record is offline (e.g., deleted). For example, if the record is marked as offline in both the source and the destination, an error may be returned. As another example, if the record is marked as online in both the source and the destination, an error may be returned. If the record is not found in either data store (e.g., with an error or "count:0" response from the data store), an error may be returned. If an attempt to obtain the record from one data store returns an error or "count:0" response, and the record is marked as deleted (tombstoned) in the other data store, an error may be returned. If the record is offline in one data store and not found or has a "deleted" (tombstoned) status in the other data store, then the method may determine that the record is offline. The offline response may represent a retriable error such that the client may resubmit the request and expect it to be performed successfully at a later time. The retriable error may represent a micro-outage for an individual record during migration of that record, but the remainder of the data set may remain available during that micro-outage. Because the authority for records may be flipped from the source to the destination on a record-by-record basis, the entire data set need not be made unavailable to clients during a data-set-wide authority flip.

Figure 9:
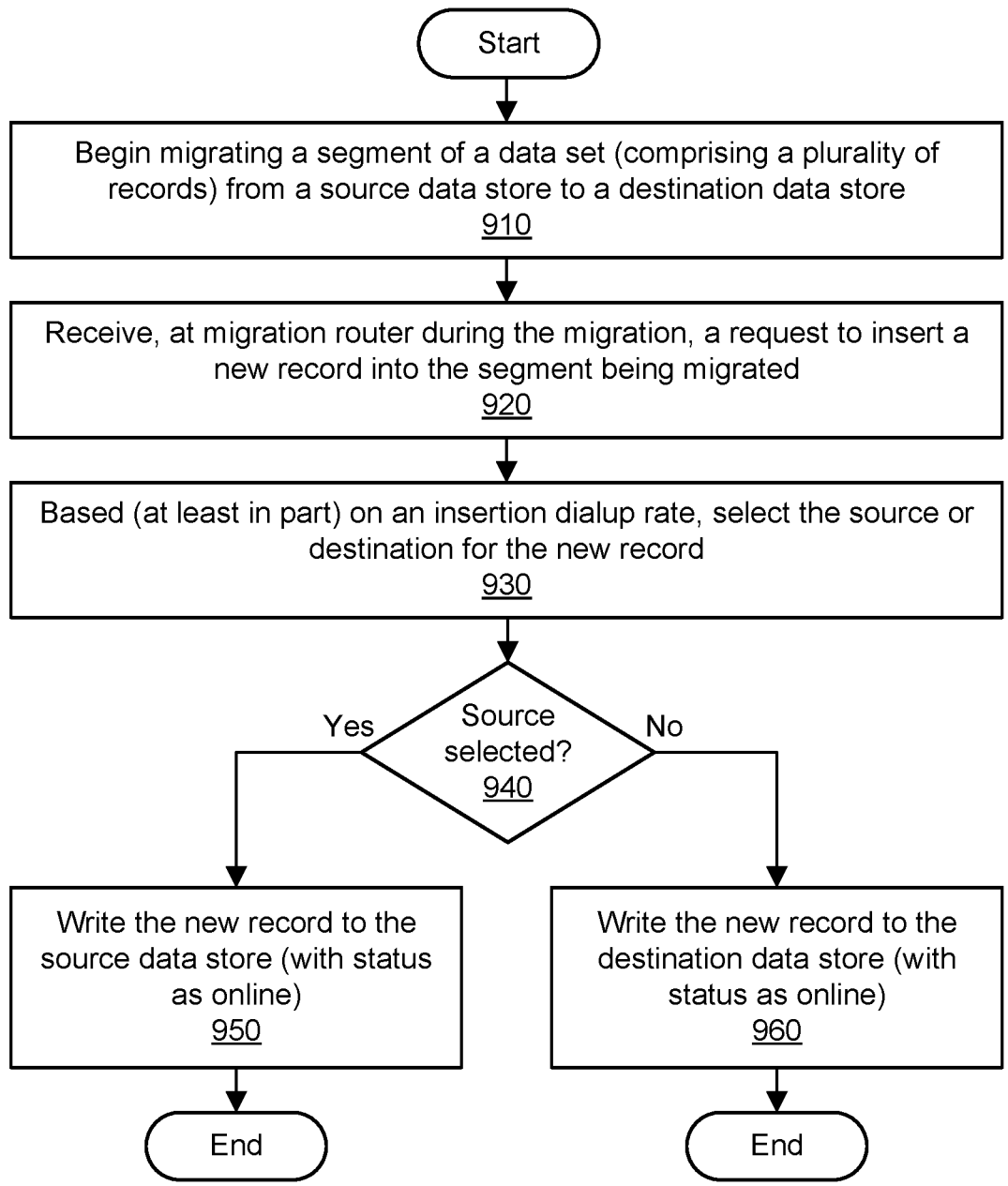
FIG. 9 is a flowchart illustrating a method for inserting a new record into the data set during a migration, according to some embodiments.

FIG. 9 is a flowchart illustrating a method for inserting a new record into the data set during a migration, according to some embodiments. As shown in 910, the method may begin migrating a segment of a data set from a source data store to a destination data store. The source and destination data stores may vary in their performance, availability, storage capacity, location, and/or other characteristics, and the migration may seek to take advantage of such characteristics offered by the destination data store. In one embodiment, a client of a live migration system may request migration of a particular data set from a source data store to a destination data store, e.g., by using an API or user interface of a control plane associated with the live migration system. In one embodiment, the live migration system itself may decide to initiate the migration in a manner transparent to the client, e.g., based on automated analysis of performance metrics. The data set may represent a table or other data structure that includes a plurality of records, rows, or other individual data elements. A data migrator of the live migration system may perform the migration on a record-by-record basis, such that the migration of one record may be independent of the migration of another record. Record-by-record migration may include migrating one record at a time or migrating a plurality of records concurrently. A fleet of migration workers running in parallel may implement the migration of individual records.

As shown in 920, during the migration, a migration router may receive, from a client, a request to write (insert) a new record to the segment currently being migrated. As shown in 830, to perform insertion of a new record into the segment being migrated, the method may select either the source data store or the destination data store for the new record. The source or destination may be selected for a given insertion based (at least in part) on an insertion dialup rate. For example, if the insertion rate is 80%, then approximately 20% of all new record insertions may be performed in the source while the remaining 80% may be performed in the destination. In one embodiment, keys or other metadata associated with the insertion requests may be hashed, and the hash space may be partitioned according to the insertion rate. For example, if the insertion rate is currently 80%, then 80% of the hash space may represent keys to be published to the destination, while the remaining 20% of the hash space may represent keys to be published to the source. The insertion rate may be incrementally dialed up during the migration to ensure that the destination is able to handle the increasing traffic. The insertion dialup rate may be automatically modified based (at least in part) on performance monitoring that captures and/or analyzes one or more performance metrics. For example, the insertion rate may be incrementally reduced (dialed down) if metrics indicate that the destination is insufficiently available for new insertions. As another example, the insertion rate may be incrementally increased (dialed up) if metrics indicate that the destination has available capacity for additional insertions. In one embodiment, the insertion rate for the segment may be incrementally increased one or more times until the rate is 100%, such that all new insertions for the segment are performed in the destination. In one embodiment, the migration may not be considered complete until the insertion rate is 100% and there are no remaining records to move from the source.

As shown in 940, the method may determine whether the source or destination was selected. If the source was selected, then as shown in 950, the new record may be written to the source data store. In one embodiment, a status of "online" may also be stored for the new record (e.g., in the source data store) to indicate that the source instance is authoritative. If the destination was selected, then as shown in 960, the new record may be written to the destination data store. In one embodiment, a status of "online" may also be stored for the new record (e.g., in the destination data store) to indicate that the destination instance is authoritative.

Segmentation of Maintenance on Distributed Systems

Figure 10:
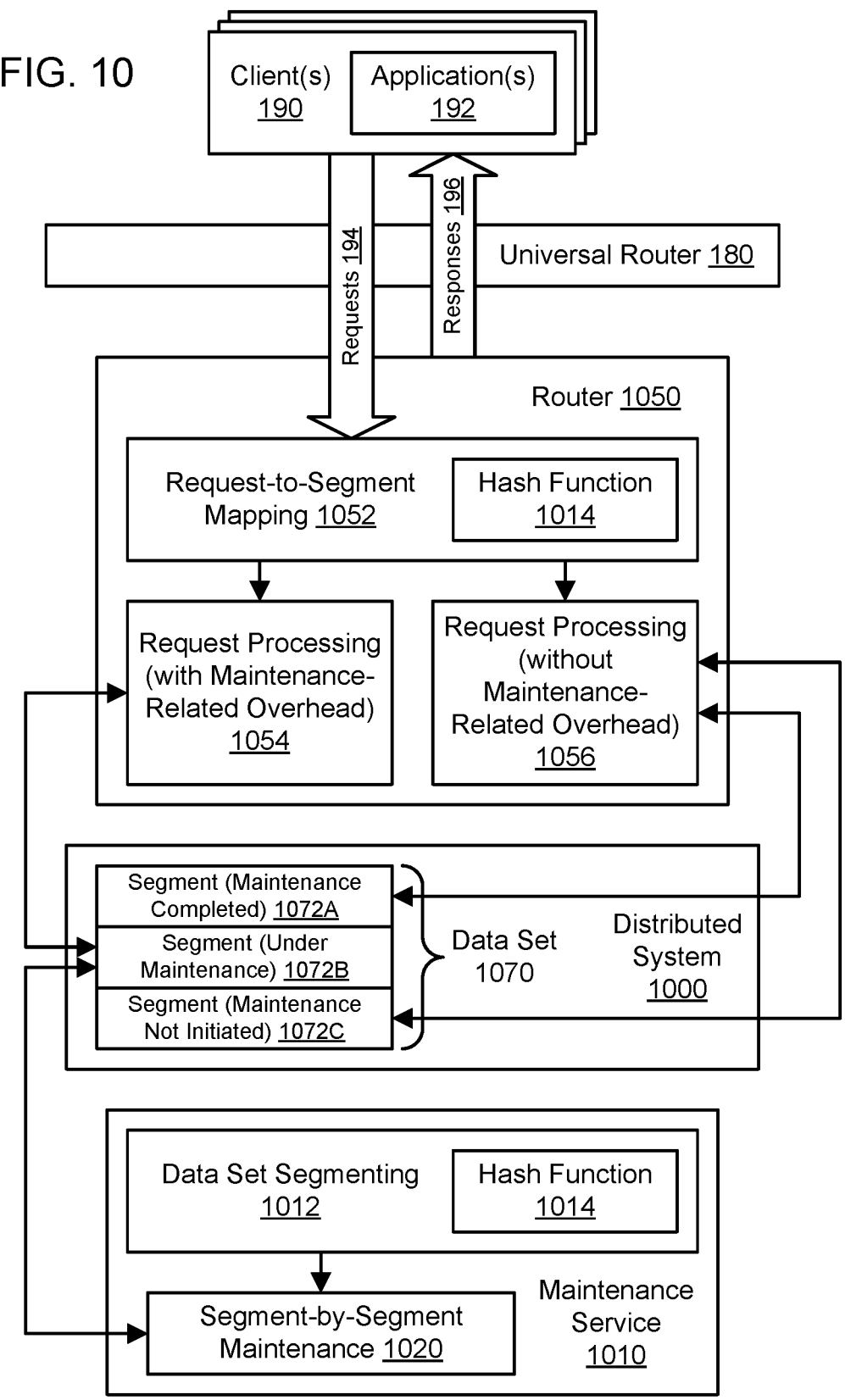
FIG. 10 illustrates an example system environment for segmentation of maintenance on distributed systems, according to some embodiments.

FIG. 10 illustrates an example system environment for segmentation of maintenance on distributed systems, according to some embodiments. A distributed system 1000 may include numerous hosts, servers, compute instances, storage instances, or other components that interact via a network (or other interconnects) to perform tasks. For example, the distributed system 1000 may include two instances of a data store (e.g., a source and destination as discussed above with respect to FIG. 1) or another distributed storage system. As another example, the distributed system 1000 may include services that collaborate according to a service-oriented architecture. As yet another example, the distributed system 1000 may include multiple instances of the same service, such as a service that performs order processing for an online store. The distributed system 1000 may operate upon a data set 1070, and individual elements of data in the data set may be identified by respective keys. For example, records in a data store, orders submitted to an online store, requests to services in a service-oriented architecture, or customer accounts with an online store may be identified by one or more elements of data or metadata that represent keys. Keys may be simple or compound. For a given data set 1070, a key space may encompass all the potential keys for that data set.

The distributed system 1000 may undergo maintenance activities from time to time. One or more maintenance activities may be performed on the data set 1070 by a maintenance service 1010. For example, a data store may be migrated from a source to a destination. As another example, a database may be optimized to improve query performance. As yet another example, customer order histories for an online store may be subjected to analysis. To improve the performance of the distributed system 1000 during a maintenance activity, the data set 1070 on which the distributed system operates may be partitioned into a plurality of segments using a component 1010 for data set segmenting. As shown in FIG. 10, for example, the data set 1070 may be partitioned into segment 1072A, segment 1072B, and segment 1072C. The segments 1072A-1072C may be nonoverlapping. In various embodiments, the data set 1070 may be partitioned into any suitable number of segments. The segments 1072A-1072C may be divided arbitrarily and need not represent equivalent numbers of keys or other even distributions of the data.

In one embodiment, the data set may be partitioned using a hash function 1014. The hash function 1014 may map the key space of the data set 1070 into a hash space, and the hash space may be divided appropriately into the segments 1072A-1072C. The hash function 1014 may vary based on requirements of the data set 1070 and/or distributed system 1000, but the hash function may not be changed until the entire data set has been subjected to the maintenance activity. In one embodiment, the segments 1072A-1072C may be determined based (at least in part) on one or more selection criteria such that a portion of the data set 1070 that meets the criteria may undergo maintenance at a given time while a remaining portion does not undergo the maintenance at that time. The selection criteria may represent one or more portions of the key space or one or more filters applied to portions of individual elements of data. The selection criteria may represent the hash function 1014. The hash function and/or selection criteria may differ from the basis for partitioning the data set within the distributed system 1000. For example, if the system 1000 represents a database with multiple partitions, then a particular segment 1072B may include keys in more than one of those partitions.

One or more segments of the data set 1070 may be subjected to the maintenance activity at a given time while one or more other segments are not subjected to the activity at that time. In one embodiment, the maintenance activity may iterate through the segments (e.g., one at a time) until the entire data set has been subjected to the activity. In the example shown in FIG. 10, a component 1020 for segment-by-segment maintenance may first perform the maintenance activity on the segment 1072A, then perform the maintenance activity on the segment 1072B, and then then perform the maintenance activity on the segment 1072C. Segments need not be subjected to maintenance in any particular order. For example, usage metrics may be collected for the distributed system 1000, the metrics may indicate that the segment 1072B has recently had the least traffic or usage of all the segments that have not yet been subjected to the maintenance activity, and the segment 1072B may be selected for segment-by-segment maintenance 1020 on such a basis. In one embodiment, similar metrics may be used to allocate additional resources (e.g., compute instances) in the distributed system 1000 for one or more segments experiencing heavier traffic or usage.

A router 1050 may permit client(s) 190 to submit live requests 194 while the maintenance 1020 is being performed. The requests 194 may represent requests to perform actions on or using the data set 1070. For example, the requests 194 may include read requests for data store records, update or delete requests for existing data store records, insert requests for new data store records, requests to read or update customer records in an online store, requests to place or update orders with an online store, and so on. As discussed above, requests may be submitted via a universal router 180 in some embodiments. The router 1050 may process requests 194 based (at least in part) on the segment with which a request is associated. Accordingly, as shown in FIG. 10, the router 1050 may include a component 1052 for request-to-segment mapping. Requests 194 may have the same types of keys as discussed above, and the request-to-segment mapping 1052 may use the same hash function 1014 as the maintenance service 1010 to associate request keys with particular ones of the segments 1072A-1072C. For example, a read request for a record in a data store may indicate a key associated with that record, and that key may be mapped into the hash space using the hash function. By applying the hash function to the key, the corresponding request may be mapped to one (and only one) of the segments 1072A-1072C. In one embodiment, requests 194 may be mapped to segments 1072A-1072C based (at least in part) on the same one or more selection criteria used to segment the data set for maintenance.

The router 1050 may store or have access to metadata indicating whether each of the segments 1072A-1072C has already undergone the maintenance activity (e.g., segment 1072A), is currently undergoing the maintenance activity (e.g., segment 1072B), or has not yet undergone the maintenance activity (e.g., segment 1072C). Requests 194 to a segment under maintenance may be processed with additional overhead related to the maintenance activity using the component 1054. For example, if the maintenance activity is a data store migration as discussed above, then the additional overhead may include determining an authoritative record for reads and updates by making calls to both the source and destination. However, requests 194 to a segment not under maintenance may be processed without the additional overhead related to the maintenance activity using the component 1056. For example, if the maintenance activity is a data store migration as discussed above, then a read request may be performed using either the source data store or the destination data store and without having to determine an authoritative record by making calls to both the source and destination. In one embodiment, requests 194 to a segment not under maintenance may be performed with less latency and/or resource consumption than requests to a segment under maintenance. Using the techniques described herein, the impact of maintenance on a distributed system 1000 may be limited using segmentation.

In one embodiment, the maintenance may include diagnostic activity applied to part of the data set 1070, and the segment 1072B may be selected for such maintenance based (at least in part) in isolation of an error or fault to the segment. For example, if errors are encountered in an ordering system, and those errors are concentrated in the segment 1072B, then only that segment 1072B may undergo the diagnostic activity. In one embodiment, requests 194 that arrive at the router 1050 and are mapped to the segment 1072B may be redirected to the diagnostic activity. Using these techniques, the additional overhead of diagnostic activity may be limited to a portion of the data set 1070.

The distributed system 1000, maintenance service 1010, and router 1050 may be implemented using one or more services. Each of the services may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. This modularity may enable services to be reused in order to build various applications through a process referred to as orchestration. A service may include one or more components that may also participate in the distributed system, e.g., by passing messages to other services or to other components within the same service. A service may offer one or more application programming interfaces (APIs) or other programmatic interfaces through which another service may request the functionality of the service. Components of the distributed system 1000, maintenance service 1010, and router 1050 may be configured to process requests from various internal or external systems, such as client computer systems 190 or computer systems consuming networked-based services (e.g., web services). For instance, an application 192 on a client computer system 190 may submit a request to read a record from a data set being migrated, and that request may be directed to the router 1050 via the universal router 180. Services may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP).

The distributed system 1000, maintenance service 1010, and router 1050 may include one or more computing devices, any of which may be implemented by the example computing device 3000 illustrated in FIG. 13. For example, the maintenance service 1010 may be implemented using one or more computing devices, and that number of devices may scale up or down according to the needs of a particular maintenance activity (e.g., the size of the segment 1072B and/or a dialup rate). In various embodiments, the functionality of the different services, components, and/or modules of the distributed system 1000, maintenance service 1010, and router 1050 may be provided by the same computing device or by different computing devices. If any of the various components are implemented using different computing devices, then the respective computing devices may be communicatively coupled, e.g., via a network. Each of the components of the distributed system 1000, maintenance service 1010, and router 1050 may represent any combination of software and hardware usable to perform their respective functions, as discussed as follows. Functions implemented by the distributed system 1000, maintenance service 1010, and router 1050 may be performed automatically, e.g., without a need for user initiation or user intervention after an initial configuration stage, and programmatically, e.g., by execution of program instructions on at least one computing device. In one embodiment, aspects of the distributed system 1000, maintenance service 1010, and router 1050 may be performed repeatedly over time. The distributed system 1000, maintenance service 1010, and router 1050 may include additional components not shown, fewer components than shown, or different combinations, configurations, or quantities of the components shown.

The router 1050 may be implemented using a plurality of different instances that are distributed throughout one or more networks, and each instance may offer access to the functionality of a live request router to various clients 190 (via the universal router 180). An individual instance of the router 1050 may be implemented using one host or a plurality of hosts, any of which may be implemented by the example computing device 3000 illustrated in FIG. 13. Similarly, the distributed system 1000 or maintenance service 1010 may represent one or more service instances and may be implemented using one host or a plurality of hosts, any of which may be implemented by the example computing device 3000 illustrated in FIG. 13. The number of hosts may scale up or down according to the needs of a particular maintenance activity (e.g., the size of the segment 1072B and/or volume of requests 194). The hosts may be located in any suitable number of data centers or geographical locations. In one embodiment, multiple services and/or instances of the same service may be implemented using the same host.

It is contemplated that any suitable number and configuration of clients 190 may interact with the router 1050. Components shown in FIG. 10 may convey network-based service requests to one another via one or more networks. In various embodiments, the network(s) may encompass any suitable combination of networking hardware and protocols necessary to establish network-based communications between two services. For example, the network(s) may generally encompass the various telecommunications networks and service providers that collectively implement the Internet. The network(s) may also include private networks such as local area networks (LANs) or wide area networks (WANs) as well as public or private wireless networks. The network(s) may include the hardware (e.g., modems, routers, switches, load balancers, proxy servers, etc.) and software (e.g., protocol stacks, accounting software, firewall/security software, etc.) necessary to establish a networking link between a first component and the Internet as well as between the Internet and a second component. In some embodiments, components may communicate with one another using a private network rather than the public Internet.

In one embodiment, aspects of the distributed system 1000, maintenance service 1010, and/or router 1050 may be implemented using computing resources of a provider network. A provider network may represent a network set up by an entity such as a company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 11:
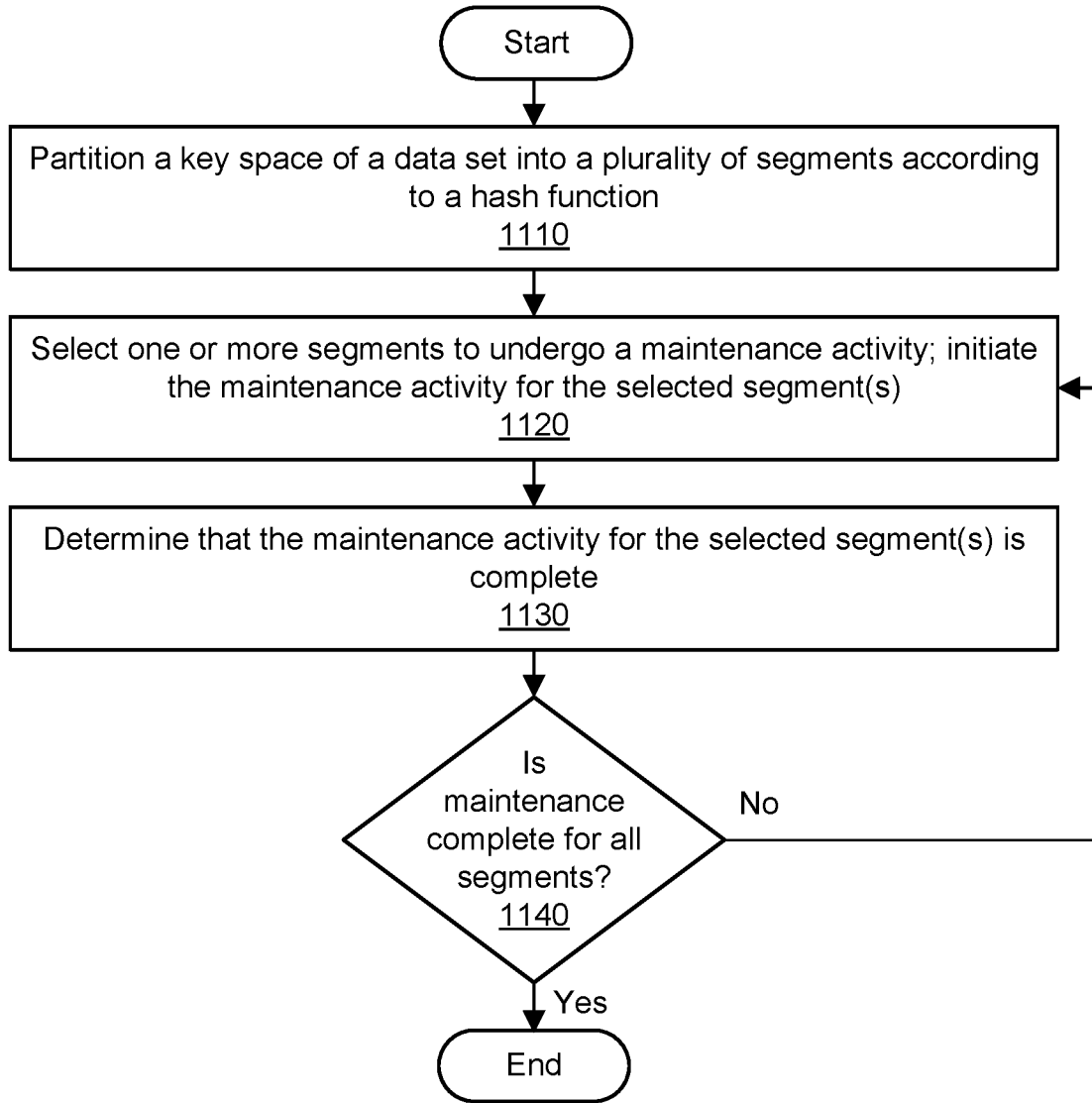
FIG. 11 is a flowchart illustrating a method for segment-by-segment maintenance on distributed systems, according to some embodiments.

FIG. 11 is a flowchart illustrating a method for segment-by-segment maintenance on distributed systems, according to some embodiments. As shown in 1110, a key space of a data set may be partitioned into a plurality of segments. In one embodiment, the data set may be partitioned using a hash function. The hash function may map the key space of the data set into a hash space, and the hash space may be divided appropriately into the segments. The hash function may vary based on requirements of the data set and/or distributed system that operates on or using that data set, but the hash function may not be changed until the entire data set has been subjected to the maintenance activity. In one embodiment, the segments may be determined based (at least in part) on one or more selection criteria such that a portion of the data set that meets the criteria may undergo maintenance at a given time while a remaining portion does not undergo the maintenance at that time. The selection criteria may represent one or more portions of the key space or one or more filters applied to portions of individual elements of data. The selection criteria may represent the hash function. The hash function and/or selection criteria may differ from the basis for partitioning the data set within the distributed system. For example, if the system represents a database with multiple partitions, then a particular segment may include keys in more than one of those partitions.

As shown in 1120, one or more of the segments may be selected to undergo a maintenance activity, and the maintenance activity may be initiated for the selected segment(s). In one embodiment, the maintenance activity may iterate through the segments (e.g., one at a time) until the entire data set has been subjected to the activity. In some embodiments, segments need not be subjected to maintenance in any particular order. For example, usage metrics for the distributed system may indicate that a particular segment has recently had the least traffic or usage of all the segments that have not yet been subjected to the maintenance activity, and that segment may be selected for segment-by-segment maintenance on such a basis.

As shown in 1130, the method may determine that the maintenance activity for the selected segment(s) is complete. For example, the maintenance for a segment may be deemed complete if every key in the segment has been processed by the maintenance activity. As shown in 1140, the method may determine whether the maintenance activity is complete for all the segments of the data set. If not, then the method may resume with the operation shown in 1120. If so, then the segment-by-segment maintenance may end.

Figure 12:
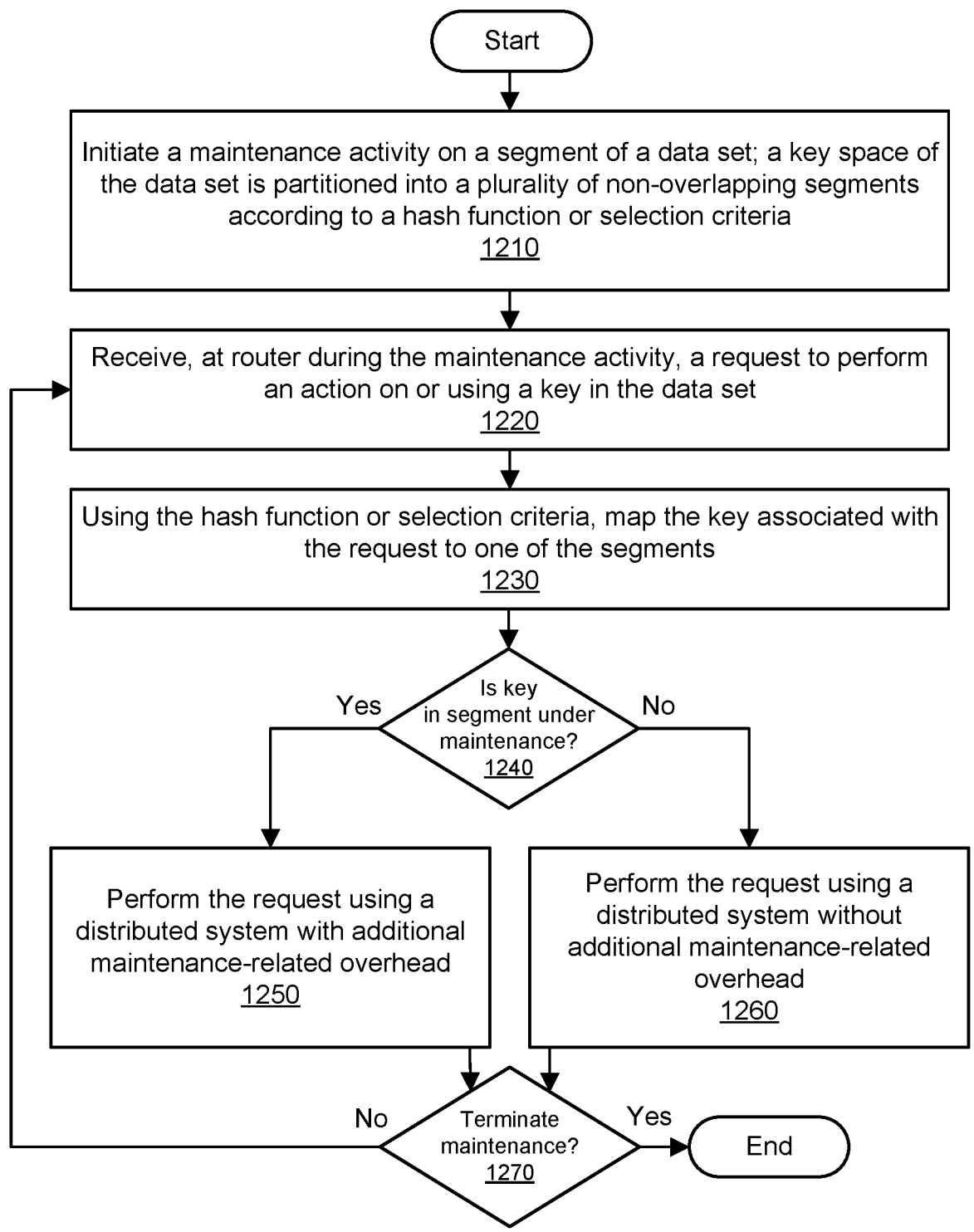
FIG. 12 is a flowchart illustrating a method for limiting the impact of maintenance overhead using segmentation, according to some embodiments.

FIG. 12 is a flowchart illustrating a method for limiting the impact of maintenance overhead using segmentation, according to some embodiments. As shown in 1210, a maintenance activity may be initiated on a segment of a data set on which a distributed system operates. A key space of the data set may be partitioned into a plurality of segments. In one embodiment, the data set may be partitioned using a hash function. The hash function may map the key space of the data set into a hash space, and the hash space may be divided appropriately into the segments. The hash function may vary based on requirements of the data set and/or distributed system that operates on or using that data set, but the hash function may not be changed until the entire data set has been subjected to the maintenance activity. In one embodiment, the segments may be determined based (at least in part) on one or more selection criteria such that a portion of the data set that meets the criteria may undergo maintenance at a given time while a remaining portion does not undergo the maintenance at that time. The maintenance activity may be applied on a segment-by-segment basis.

As shown in 1220, during the maintenance activity, a router may receive a request to perform an action on or using a key in the data set. The request may be received from a client of the distributed system, potentially via a universal router. For example, the request may include a read request for a data store record, an update or delete request for an existing data store record, an insert request for a new data store record, a request to read or update customer records in an online store, a request to place or update orders with an online store, and so on. As shown in 1230, the router may map the key in the request to one of the segments. The request may be mapped to a segment using the same hash function or selection criteria used to partition the data set originally.

The router and distributed system may process requests based (at least in part) on the segment with which a request is associated. As shown in 1240, the method may determine whether the key in the request is in a segment under maintenance. The router may store or have access to metadata indicating whether each of the segments has already undergone the maintenance activity, is currently undergoing the maintenance activity, or has not yet undergone the maintenance activity. If request is mapped to a segment under maintenance, then as shown in 1250, the request may be performed in the distributed system with additional maintenance-related overhead and/or processing. If request is mapped to a segment not under maintenance, then as shown in 1260, the request may be performed in the distributed system without the additional maintenance-related overhead and/or processing. As shown in 1270, the method may determine whether to terminate the maintenance on the data set. If so, then the method may end. If not, then the method may continue with the operation shown in 1220 or 1210. In one embodiment, as discussed above, the method may iterate through all the segments until the entire data set has undergone the maintenance activity.

Illustrative Computer System

In at least some embodiments, a computer system that implements a portion or all of one or more of the technologies described herein may include a computer system that includes or is configured to access one or more computer-readable media. FIG. 13 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

Embodiments of the disclosure can be described in view of the following clauses:

Clause 1. A system, comprising:

a source data store;

a destination data store; and one or more computing devices configured to implement a data migrator, wherein the data migrator is configured to:

initiate a migration of a data set from the source data store to the destination data store, wherein the data set comprises a plurality of records in a plurality of segments including a first segment not being migrated and a second segment being migrated, and wherein, for an individual record in the second segment, the data migrator is configured to:

store, in the source data store, a first status indicating that the individual record is offline in the source data store;

store, in the destination data store, an instance of the individual record and a second status indicating that the individual record is online in the destination data store, wherein the instance of the individual record and the second status are stored in the destination data store after the first status is stored in the source data store; and delete the individual record from the source data store after the instance of the individual record and the second status are stored in the destination data store; and one or more computing devices configured to implement a migration router, wherein the migration router is configured to:

receive, from a client during the migration, a read request for the individual record;

determine that the individual record is associated with the second segment;

based at least in part on the individual record being associated with the second segment, determine, using the first status and the second status, that the instance of the individual record in the destination data store represents an authoritative instance of the individual record for the read request; and return, to the client, the authoritative instance of the individual record as a response to the read request.

Clause 2. The system as recited in clause 1, wherein the migration router is further configured to:

receive, during the migration, a write request for the individual record;

determine that the individual record is associated with the second segment;

based at least in part on the individual record being associated with the second segment, determine that the instance of the individual record in the destination data store represents the authoritative instance of the individual record for the write request based at least in part on the first status and the second status; and modify the authoritative instance of the individual record according to the write request.

Clause 3. The system as recited in clause 1, wherein the migration router is further configured to:

receive, during the migration, a write request for a new record;

determine that the new record is associated with the second segment;

based at least in part on the new record being associated with the second segment, perform a selection of the source data store or the destination data store for the write request based at least in part on a dialup rate; and insert the new record in source data store or the destination data store according to the selection.

Clause 4. The system as recited in clause 1, wherein the migration router is further configured to:

receive, during the migration, an additional request to access an additional record;

determine that the additional record is associated with the first segment; and based at least in part on the additional record being associated with the first segment, perform the additional request using the source data store or the destination data store without obtaining a status of the additional record from the source data store and the destination data store.

Clause 5. A computer-implemented method, comprising:

initiating a migration of a data set from a first data store to a second data store, wherein the data set comprises a plurality of records in a plurality of segments including a first segment not being migrated and a second segment being migrated, and wherein, for an individual record in the second segment, the migration comprises:

storing a first status indicating that the individual record is offline in the first data store;

storing an instance of the individual record in the second data store;

storing a second status indicating that the individual record is online in the second data store; and deleting the individual record from the first data store after the instance of the individual record and the second status are stored; and receiving, during the migration, a read request for the individual record;

determine that the individual record is associated with the second segment; and generating a response to the read request comprising an authoritative instance of the individual record, wherein the instance of the individual record in the second data store is determined to represent the authoritative instance of the individual record based at least in part on the first status and the second status.

Clause 6. The method as recited in clause 5, further comprising:

receiving, during the migration, a write request for the individual record;

determining that the individual record is associated with the second segment;

based at least in part on the individual record being associated with the second segment, determining that the instance of the individual record in the second data store represents the authoritative instance of the individual record for the write request based at least in part on the first status and the second status; and modifying the authoritative instance of the individual record according to the write request.

Clause 7. The method as recited in clause 5, further comprising:

receiving a write request for a new record;

determining that the new record is associated with the second segment;

based at least in part on the new record being associated with the second segment, performing a selection of the first data store or the second data store for the write request according to a dialup rate; and inserting the new record in first data store or the second data store according to the selection.

Clause 8. The method as recited in clause 7, further comprising:

determining one or more metrics describing a performance of the second data store; and increasing or decreasing the dialup rate one or more times based at least in part on the one or more metrics.

Clause 9. The method as recited in clause 5, wherein a maximum quantity of the records in the second segment migrated during a window of time is determined according to a migration dialup rate, and wherein the method further comprises:

determining one or more metrics describing a performance of the second data store during the migration; and increasing or decreasing the migration dialup rate one or more times based at least in part on the one or more metrics.

Clause 10. The method as recited in clause 5, further comprising:

after the first status is stored and before the second status is stored, receiving an additional read request for the individual record; and returning a retriable error in response to the additional read request, wherein the retriable error is returned based at least in part on the first status and an absence of the individual record in the second data store.

Clause 11. The method as recited in clause 5, wherein the read request is sent by an application to a universal router, wherein the universal router is modified to send the read request to a migration router during the migration, and wherein the response to the read request is generated by the migration router.

Clause 12. The method as recited in clause 5, further comprising:

receiving, during the migration, an additional request to access an additional record;

determining that the additional record is associated with the first segment; and based at least in part on the additional record being associated with the first segment, performing the additional request using the first data store or the second data store without obtaining a status of the additional record from the first data store and the second data store.

Clause 13. One or more non-transitory computer-readable storage media storing program instructions that, when executed on or across one or more processors, perform:

initiating, by a data migrator, a migration of a data set from a first data store to a second data store, wherein the data set comprises a plurality of records in a plurality of segments including a first segment not being migrated and a second segment being migrated, and wherein, for an individual record in the second segment, the migration comprises:

storing a first status indicating that the individual record is offline in the first data store;

storing, in the second data store after the first status is stored, an instance of the individual record and a second status indicating that the individual record is online in the second data store; and deleting the individual record from the first data store after the instance of the individual record and the second status are stored; and receiving, by a migration router during the migration, a read request for the individual record;

determine that the individual record is associated with the second segment; and based at least in part on the individual record being associated with the second segment, generating, by the migration router, a response to the read request comprising an authoritative instance of the individual record, wherein the instance of the individual record in the second data store is determined to represent the authoritative instance of the individual record based at least in part on the first status and the second status.

Clause 14. The one or more non-transitory computer-readable storage media as recited in clause 13, further comprising additional program instructions that, when executed on or across the one or more processors, perform:

receiving, by the migration router during the migration, a write request for the individual record;

determining that the individual record is associated with the second segment;

based at least in part on the individual record being associated with the second segment, determining, by the migration router, that the instance of the individual record in the second data store represents the authoritative instance of the individual record for the write request based at least in part on the first status and the second status; and modifying the authoritative instance of the individual record according to the write request.

Clause 15. The one or more non-transitory computer-readable storage media as recited in clause 13, further comprising additional program instructions that, when executed on or across the one or more processors, perform:

receiving, by the migration router during the migration, a write request for a new record;

determining that the new record is associated with the second segment;

based at least in part on the new record being associated with the second segment, performing, by the migration router, a selection of the first data store or the second data store for the write request based at least in part on a dialup rate; and inserting the new record in first data store or the second data store according to the selection.

Clause 16. The one or more non-transitory computer-readable storage media as recited in clause 15, further comprising additional program instructions that, when executed on or across the one or more processors, perform:

determining one or more metrics describing a performance of the second data store during the migration; and increasing or decreasing the dialup rate based at least in part on the one or more metrics, wherein the dialup rate is increased or decreased one or more times during the migration.

Clause 17. The one or more non-transitory computer-readable storage media as recited in clause 13, wherein the dialup rate is increased to 100% before the migration is completed.

Clause 18. The one or more non-transitory computer-readable storage media as recited in clause 13, further comprising additional program instructions that, when executed on or across the one or more processors, perform:

determining one or more errors associated with the migration; and decreasing a rate of the migration based at least in part on the one or more errors.

Clause 19. The one or more non-transitory computer-readable storage media as recited in clause 13, further comprising additional program instructions that, when executed on or across the one or more processors, perform:

after the first status is stored and before the second status is stored, receiving, by the migration router, an additional read request for the individual record; and returning, by the migration router, a retriable error in response to the additional read request, wherein the retriable error is returned based at least in part on the first status and an absence of the individual record in the second data store.

Clause 20. The one or more non-transitory computer-readable storage media as recited in clause 13, wherein the read request is sent by an application to a universal router, wherein the universal router is modified to send the read request to a migration router during the migration, wherein the application is not modified to send the read request to the migration router, and wherein the response to the read request is generated by the migration router.

Clause 21. A system, comprising:

a plurality of computing devices configured to implement a distributed system that operates on a data set, wherein individual elements of the data set are identified by respective keys;

one or more computing devices configured to implement a maintenance service, wherein the maintenance service is configured to:

partition a key space of the data set into a plurality of segments according to a hash function, wherein the segments comprise a first segment and a second segment; and initiate a maintenance activity on the first segment; and one or more computing devices configured to implement a router, wherein the router is configured to:

receive, during the maintenance activity on the first segment, a first request to perform a first action on the data set;

determine, using the hash function, that the first request is associated with the first segment;

based at least in part on the first request being associated with the first segment, cause the first action to be performed with additional overhead associated with the maintenance activity;

receive, during the maintenance activity on the first segment, a second request to perform a second action on the data set;

determine, using the hash function, that the second request is associated with the second segment; and based at least in part on the second request being associated with the second segment, cause the second action to be performed without the additional overhead associated with the maintenance activity.

Clause 22. The system as recited in clause 21, wherein the maintenance activity is initiated on the first segment based at least in part on one or more metrics indicating that the first segment has less traffic than the second segment.

Clause 23. The system as recited in clause 21, wherein one or more metrics indicate that the second segment has a largest amount of traffic of the plurality of segments, and wherein the second request is redirected to a set of one or more additional computing resources based at least in part on the one or more metrics.

Clause 24. The system as recited in clause 21, wherein the maintenance activity comprises a diagnostic activity, and wherein the diagnostic activity is initiated on the first segment based at least in part on isolation of a failure to the first segment.

Clause 25. A computer-implemented method, comprising:

initiating a maintenance activity on a first segment of a data set, wherein the data set is partitioned according to one or more selection criteria into a plurality of non-overlapping segments comprising the first segment and a second segment;

receiving, during the maintenance activity on the first segment, a first request to perform a first action on the data set;

based at least in part on determining that the first request is associated with the first segment using the one or more selection criteria, performing the first action using additional processing associated with the maintenance activity;

receiving, during the maintenance activity on the first segment, a second request to perform a second action on the data set; and based at least in part on determining that the second request is associated with the second segment of the data set using the one or more selection criteria, performing the second action without the additional processing associated with the maintenance activity.

Clause 26. The method as recited in clause 25, wherein the maintenance activity is initiated on the first segment based at least in part on one or more metrics indicating that the first segment has less traffic than the second segment.

Clause 27. The method as recited in clause 25, wherein one or more metrics indicate that the second segment has a largest amount of traffic of the plurality of segments, and wherein the second request is redirected to a set of one or more additional computing resources based at least in part on the one or more metrics.

Clause 28. The method as recited in clause 25, wherein the maintenance activity comprises a diagnostic activity, and wherein the diagnostic activity is initiated on the first segment based at least in part on isolation of a failure to the first segment.

Clause 29. The method as recited in clause 25, wherein the maintenance activity comprises data migration from a source data store to a destination data store, wherein the first action comprises reading or updating one or more keys in the first segment, wherein the second action comprises reading or updating one or more keys in the second segment, and wherein the additional processing comprises using the source data store and the destination data store to respond to the first request.

Clause 30. The method as recited in clause 29, wherein the first segment includes a plurality of keys in a plurality of partitions of the source data store and destination data store.

Clause 31. The method as recited in clause 25, further comprising:
   terminating the maintenance activity on the first segment;
   initiating the maintenance activity on the second segment after terminating the maintenance activity on the first segment;
   receiving, during the maintenance activity on the second segment, a third request to perform a third action on the data set;
   based at least in part on determining that the third request is associated with the third segment using the one or more selection criteria, performing the third action without the additional processing associated with the maintenance activity;
   receiving, during the maintenance activity on the second segment, a fourth request to perform a fourth action on the data set; and
   based at least in part on determining that the fourth request is associated with the second segment of the data set using the one or more selection criteria, performing the fourth action using the additional processing associated with the maintenance activity.

Clause 32. The method as recited in clause 25, wherein the first action and the second action are performed using a distributed system that operates on the data set.

Clause 33. One or more non-transitory computer-readable storage media storing program instructions that, when executed on or across one or more processors, perform:
   partitioning a data set into a plurality of segments according to a hash function, wherein the segments comprise a first segment and a second segment;
   initiating a maintenance activity on the first segment and not on the second segment; and
   receiving, during the maintenance activity on the first segment, a first request to perform a first action on the data set;
   based at least in part on determining that the first request is associated with the first segment using the hash function, performing the first action using a distributed system with additional overhead associated with the maintenance activity;
   receiving, during the maintenance activity on the first segment, a second request to perform a second action on the data set; and
   based at least in part on determining that the second request is associated with the second segment using the hash function, performing the second action using the distributed system without the additional overhead associated with the maintenance activity.

Clause 34. The one or more non-transitory computer-readable storage media as recited in clause 33, wherein the maintenance activity is initiated on the first segment based at least in part on one or more metrics indicating that the first segment has less traffic than the second segment.

Clause 35. The one or more non-transitory computer-readable storage media as recited in clause 33, wherein one or more metrics indicate that the second segment has a largest amount of traffic of the plurality of segments, and wherein the second request is redirected to a set of one or more additional computing resources based at least in part on the one or more metrics.

Clause 36. The one or more non-transitory computer-readable storage media as recited in clause 33, wherein the maintenance activity comprises a diagnostic activity, and wherein the diagnostic activity is initiated on the first segment based at least in part on isolation of a failure to the first segment.

Clause 37. The one or more non-transitory computer-readable storage media as recited in clause 33, wherein the maintenance activity comprises data migration from a source data store to a destination data store, wherein the first action comprises reading or updating one or more keys in the first segment, wherein the second action comprises reading or updating one or more keys in the second segment, and wherein the additional processing comprises using the source data store and the destination data store to respond to the first request.

Clause 38. The one or more non-transitory computer-readable storage media as recited in clause 37, wherein the first segment includes a plurality of keys in a plurality of partitions of the source data store and destination data store.

Clause 39. The one or more non-transitory computer-readable storage media as recited in clause 33, further comprising additional program instructions that, when executed on or across the one or more processors, perform:
   terminating the maintenance activity on the first segment;
   initiating the maintenance activity on the second segment after terminating the maintenance activity on the first segment;
   receiving, during the maintenance activity on the second segment, a third request to perform a third action on the data set;
   based at least in part on determining that the third request is associated with the third segment using the hash function, performing the third action without the additional overhead associated with the maintenance activity;
   receiving, during the maintenance activity on the second segment, a fourth request to perform a fourth action on the data set; and
   based at least in part on determining that the fourth request is associated with the second segment of the data set using the hash function, performing the fourth action with the additional overhead associated with the maintenance activity.

Clause 40. The one or more non-transitory computer-readable storage media as recited in clause 33, wherein the maintenance activity comprises database optimization.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of computing devices comprising respective processors and memory and configured to implement a distributed system that operates on a data set, wherein individual elements of the data set are identified by respective keys;
   one or more computing devices comprising one or more respective processors and memory and configured to implement a maintenance service, wherein the maintenance service is configured to:
      partition a key space of the data set into a plurality of segments according to a hash function, wherein the segments comprise a first segment and a second segment; and
      initiate a maintenance activity on the first segment; and
   one or more computing devices comprising one or more respective processors and memory and configured to implement a router, wherein the router is configured to:
      receive, during the maintenance activity on the first segment, a first request to perform a first action on the data set;
      determine, using the hash function, that the first request is associated with the first segment;
      based at least in part on the first request being associated with the first segment, cause the first action to be performed with additional overhead associated with the maintenance activity;
      receive, during the maintenance activity on the first segment, a second request to perform a second action on the data set;
      determine, using the hash function, that the second request is associated with the second segment; and
      based at least in part on the second request being associated with the second segment, cause the second action to be performed without the additional overhead associated with the maintenance activity.

2. The system as recited in claim 1, wherein the maintenance activity is initiated on the first segment based at least in part on one or more metrics indicating that the first segment has less traffic than the second segment.

3. The system as recited in claim 1, wherein one or more metrics indicate that the second segment has a largest amount of traffic of the plurality of segments, and wherein the second request is redirected to a set of one or more additional computing resources based at least in part on the one or more metrics.

4. The system as recited in claim 1, wherein the maintenance activity comprises a diagnostic activity, and wherein the diagnostic activity is initiated on the first segment based at least in part on isolation of a failure to the first segment.

5. A computer-implemented method, comprising:
   initiating a maintenance activity on a first segment of a data set, wherein the data set is partitioned according to one or more selection criteria into a plurality of non-overlapping segments comprising the first segment and a second segment;
   receiving, during the maintenance activity on the first segment, a first request to perform a first action on the data set;
   based at least in part on determining that the first request is associated with the first segment using the one or more selection criteria, performing the first action using additional processing associated with the maintenance activity;
   receiving, during the maintenance activity on the first segment, a second request to perform a second action on the data set; and
   based at least in part on determining that the second request is associated with the second segment of the data set using the one or more selection criteria, performing the second action without the additional processing associated with the maintenance activity.

6. The method as recited in claim 5, wherein the maintenance activity is initiated on the first segment based at least in part on one or more metrics indicating that the first segment has less traffic than the second segment.

7. The method as recited in claim 5, wherein one or more metrics indicate that the second segment has a largest amount of traffic of the plurality of segments, and wherein the second request is redirected to a set of one or more additional computing resources based at least in part on the one or more metrics.

8. The method as recited in claim 5, wherein the maintenance activity comprises a diagnostic activity, and wherein the diagnostic activity is initiated on the first segment based at least in part on isolation of a failure to the first segment.

9. The method as recited in claim 5, wherein the maintenance activity comprises data migration from a source data store to a destination data store, wherein the first action comprises reading or updating one or more keys in the first segment, wherein the second action comprises reading or updating one or more keys in the second segment, and wherein the additional processing comprises using the source data store and the destination data store to respond to the first request.

10. The method as recited in claim 9, wherein the first segment includes a plurality of keys in a plurality of partitions of the source data store and destination data store.

11. The method as recited in claim 5, further comprising:
terminating the maintenance activity on the first segment;
initiating the maintenance activity on the second segment after terminating the maintenance activity on the first segment;
receiving, during the maintenance activity on the second segment, a third request to perform a third action on the data set;
based at least in part on determining that the third request is associated with the third segment using the one or more selection criteria, performing the third action without the additional processing associated with the maintenance activity;
receiving, during the maintenance activity on the second segment, a fourth request to perform a fourth action on the data set; and
based at least in part on determining that the fourth request is associated with the second segment of the data set using the one or more selection criteria, performing the fourth action using the additional processing associated with the maintenance activity.

12. The method as recited in claim 5, wherein the first action and the second action are performed using a distributed system that operates on the data set.

13. One or more non-transitory computer-readable storage media storing program instructions that, when executed on or across one or more processors, perform:
partitioning a data set into a plurality of segments according to a hash function, wherein the segments comprise a first segment and a second segment;
initiating a maintenance activity on the first segment and not on the second segment; and
receiving, during the maintenance activity on the first segment, a first request to perform a first action on the data set;
based at least in part on determining that the first request is associated with the first segment using the hash function, performing the first action using a distributed system with additional overhead associated with the maintenance activity;
receiving, during the maintenance activity on the first segment, a second request to perform a second action on the data set; and
based at least in part on determining that the second request is associated with the second segment using the hash function, performing the second action using the distributed system without the additional overhead associated with the maintenance activity.

14. The one or more non-transitory computer-readable storage media as recited in claim 13, wherein the maintenance activity is initiated on the first segment based at least in part on one or more metrics indicating that the first segment has less traffic than the second segment.

15. The one or more non-transitory computer-readable storage media as recited in claim 13, wherein one or more metrics indicate that the second segment has a largest amount of traffic of the plurality of segments, and wherein the second request is redirected to a set of one or more additional computing resources based at least in part on the one or more metrics.

16. The one or more non-transitory computer-readable storage media as recited in claim 13, wherein the maintenance activity comprises a diagnostic activity, and wherein the diagnostic activity is initiated on the first segment based at least in part on isolation of a failure to the first segment.

17. The one or more non-transitory computer-readable storage media as recited in claim 13, wherein the maintenance activity comprises data migration from a source data store to a destination data store, wherein the first action comprises reading or updating one or more keys in the first segment, wherein the second action comprises reading or updating one or more keys in the second segment, and wherein the additional processing comprises using the source data store and the destination data store to respond to the first request.

18. The one or more non-transitory computer-readable storage media as recited in claim 17, wherein the first segment includes a plurality of keys in a plurality of partitions of the source data store and destination data store.

19. The one or more non-transitory computer-readable storage media as recited in claim 13, further comprising additional program instructions that, when executed on or across the one or more processors, perform:
terminating the maintenance activity on the first segment;
initiating the maintenance activity on the second segment after terminating the maintenance activity on the first segment;
receiving, during the maintenance activity on the second segment, a third request to perform a third action on the data set;
based at least in part on determining that the third request is associated with the third segment using the hash function, performing the third action without the additional overhead associated with the maintenance activity;
receiving, during the maintenance activity on the second segment, a fourth request to perform a fourth action on the data set; and
based at least in part on determining that the fourth request is associated with the second segment of the data set using the hash function, performing the fourth action with the additional overhead associated with the maintenance activity.

20. The one or more non-transitory computer-readable storage media as recited in claim 13, wherein the maintenance activity comprises database optimization.

* * * * *